United States Patent
Miranda et al.

(10) Patent No.: US 11,216,211 B1
(45) Date of Patent: Jan. 4, 2022

(54) EMULATED BLOCK STORAGE FOR DEVICES

(71) Applicant: Amazon Technologies, Inc., Seattle, WA (US)

(72) Inventors: Mauricio Da Silva Miranda, Sammamish, WA (US); Calvin Yue-Ren Kuo, Mercer Island, WA (US); Jonathan I. Turow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 16/141,403

(22) Filed: Sep. 25, 2018

(51) Int. Cl.
*G06F 3/06* (2006.01)
*G06F 8/71* (2018.01)

(52) U.S. Cl.
CPC .......... *G06F 3/0659* (2013.01); *G06F 3/0604* (2013.01); *G06F 3/064* (2013.01); *G06F 3/067* (2013.01); *G06F 3/0644* (2013.01); *G06F 3/0664* (2013.01); *G06F 8/71* (2013.01)

(58) Field of Classification Search
CPC .... G06F 3/0659; G06F 3/0604; G06F 3/0644; G06F 3/0664; G06F 3/067; G06F 8/71
See application file for complete search history.

(56) References Cited

U.S. PATENT DOCUMENTS

| | | | | |
|---|---|---|---|---|
| 9,064,117 | B1* | 6/2015 | Worsley | G06F 11/1415 |
| 9,519,664 | B1* | 12/2016 | Kharatishvili | G06F 16/316 |
| 2003/0079096 | A1* | 4/2003 | Murakami | G07F 7/1008 |
| | | | | 711/156 |
| 2005/0049848 | A1* | 3/2005 | Dai | G06F 3/0664 |
| | | | | 703/24 |
| 2005/0120157 | A1* | 6/2005 | Chen | G06F 13/385 |
| | | | | 710/313 |
| 2008/0052461 | A1* | 2/2008 | Kavian | G06F 3/0607 |
| | | | | 711/115 |
| 2009/0024752 | A1* | 1/2009 | Shitomi | G06F 3/067 |
| | | | | 709/230 |
| 2009/0025091 | A1* | 1/2009 | Koike | G06F 21/79 |
| | | | | 726/28 |
| 2009/0144487 | A1* | 6/2009 | Liu | G06F 3/0664 |
| | | | | 711/103 |
| 2011/0154305 | A1* | 6/2011 | LeRoux | G06F 8/71 |
| | | | | 717/140 |
| 2013/0007883 | A1* | 1/2013 | Zaitsev | G06F 21/561 |
| | | | | 726/24 |

(Continued)

*Primary Examiner* — Nanci N Wong
(74) *Attorney, Agent, or Firm* — Davis Wright Tremaine LLP

(57) ABSTRACT

Technology is described for controlling different types of physical devices in a device farm hosted in a service provider environment. A removable storage slot adapter may be physically inserted into a removable storage slot of a physical device. The removable storage slot adapter may present an emulated removable storage device using a removable storage configuration obtained over a network from a management service hosted by the service provider environment. The removable storage slot adapter may interpret commands from the device to access data blocks of the emulated removable storage device. The removable storage slot adapter may access a storage service hosted by the service provider environment to fulfill the commands and data access operations requested from the device.

20 Claims, 12 Drawing Sheets

(56) References Cited

U.S. PATENT DOCUMENTS

| | | | |
|---|---|---|---|
| 2014/0075169 A1* | 3/2014 | Andrews | G06F 8/60 713/2 |
| 2017/0160992 A1* | 6/2017 | Christmas | G06F 3/08 |

\* cited by examiner

EMULATED BLOCK STORAGE FOR DEVICES

BACKGROUND

Advancements in communication technologies have allowed relatively less expensive electronic devices to communicate with other devices and computing systems over a computer network. For example, the Internet of Things (IoT) is the interconnection of computing devices scattered across the globe using the existing Internet infrastructure. Devices enabled with IoT functionality may be expected to number in the billions or trillions over the next few years. Many times, devices enabled with IoT functionality may be designed to run applications or process data content.

Such devices (e.g., computing devices or embedded devices) may be able to capture data and then the devices may securely communicate the data over a network to a centralized computing service in a service provider environment. In another example, the devices may send the data to a computing hub or computing node within a local wireless network, and the computing hub may forward the data received from the devices to the centralized service in the service provider environment. Moreover, the devices may also be configured to access computing systems, content, distributed services, and/or applications using security protocols, encryption, and other security features to communicate securely and access secure information. The devices being described may also provide expanded storage and functionality using expandable storage systems. For example, removable storage devices such as SD (secure digital) storage memory or similar removable storage systems may provide expanded storage for data and applications.

DETAILED DESCRIPTION

Figure 1:
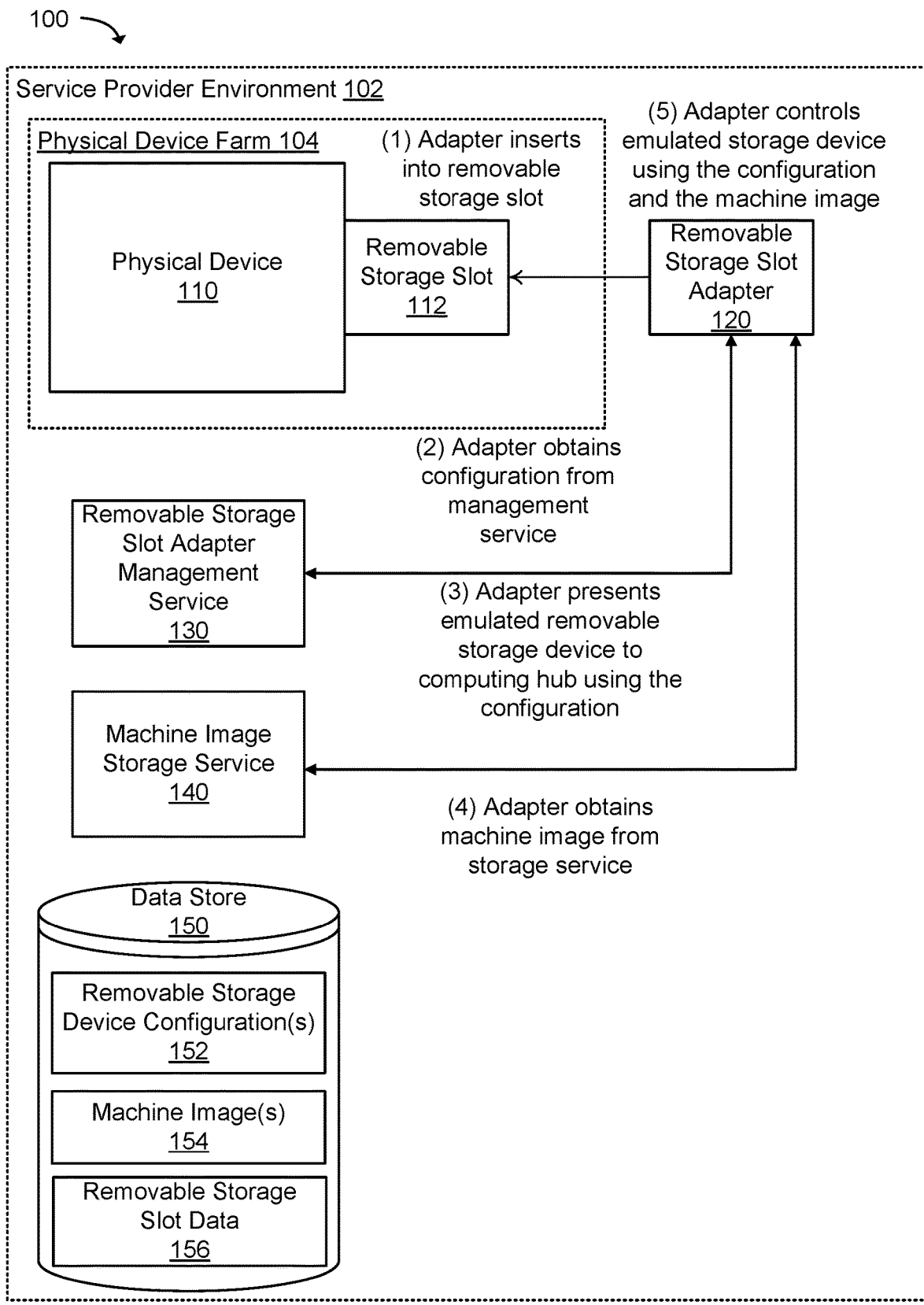
FIG. 1 illustrates a system and related operations that may implement emulated block storage for physical devices according to one example of the present technology.

A technology is described for controlling and managing devices physically hosted in a service provider environment. Different types of physical devices may be offered to accounts of the service provider environment in a physical device farm. The physical devices may be accessed by the accounts, for example, to enable evaluation and performance testing of the devices with applications and data owned by the accounts. Multi-account access to individual physical devices may be managed by a management service hosted by the service provider environment. The service provider environment may implement the control and management of a physical device through control and management of emulated block storage interfacing with the device.

According to the present technology, a removable storage slot adapter may be sized to be physically inserted into or connected to a removable storage slot of a physical device in a device farm offered by a service provider environment. The removable storage slot adapter may be packaged, for example, to be the size of a Secure Digital (SD) memory card or the removable slot adapter may have electrical contacts to connect with the removable storage slot. The removable storage slot adapter may be configurable to act as a removable storage device when inserted into the removable storage slot of the physical device. The removable storage slot adapter may control and provide data to the removable storage slot of the physical device to present an emulated removable storage device to the physical device.

According to one example of the present technology, the removable storage slot adapter may control emulated block storage presented to a physical device for an account using an emulated removable storage configuration. The emulated removable storage configuration may include a configuration document, such as an extensible markup language (XML) or a JavaScript objection notation (JSON) document. The emulated removable storage configuration may include a set of emulation parameters. For example, the emulated removable storage configuration may include a size parameter, a speed parameter, memory card manufacturer, a memory card security setting, a memory card feature, a control command set, a data transfer protocol, and the like. The removable storage slot adapter may present the emulated removable storage device to the physical device with a configurable size and speed emulating a real-world usage scenario for a physical, removable storage chip or card. The emulated removable storage configuration may further specify an image file that configures a block storage volume of the emulated removable storage device. The removable storage slot adapter may access the image file over a network from a storage service hosted by the service provider environment. The removable storage slot adapter may request data in the image file from the storage service over the network and load the data into the block storage volume to present the emulated removable storage device to the physical device.

According to another example of the present technology, the removable storage slot adapter may interpret commands from a physical device to access data blocks of an emulated removable storage device as presented to the physical device by the removable storage slot adapter. The removable storage slot adapter may determine whether to access data blocks of the emulated removable storage device from a storage service over the network to fulfill commands received from the physical device. The removable storage slot adapter may fulfill commands received from the physical device by reading and writing to an image file stored by the storage service. The removable storage slot adapter may also determine whether to access data blocks of the emulated removable storage device from a storage device within the removable storage slot adapter, such as a flash memory device which is in the emulated removable storage device. The removable storage slot adapter may optionally cache data blocks obtained from the storage service over the network in the storage device within the removable storage slot adapter. The removable storage slot adapter may additionally fulfill commands received from the device by reading and writing to the storage device within the removable storage slot adapter.

According to a further example of the present technology, the removable storage slot adapter may store data blocks obtained from the storage service over the network in the storage device and mark the data blocks as read-only. The removable storage slot adapter may buffer changes made to the data blocks stored in the storage device and marked as read-only and later send the changes to the data blocks for storage over the network to the storage service. As such, the removable storage slot adapter may designate one or more data blocks in the storage device as read-only. The removable storage slot adapter may receive data to be written to a read-only data block and place the data in a buffer. The removable storage slot adapter may send the data to the storage service over the network and request that the storage service update an image file in order to preserve the changes made to the data block.

According to another example of the present technology, the removable storage slot adapter may interpret status commands and data transfer commands to an emulated removable storage device from a physical device into which the removable storage slot adapter is inserted. The removable storage slot adapter may maintain status information for the emulated removable storage device and generate a response to a status command from the physical device. The removable storage slot adapter may access data in a storage service hosted by a service provider environment and in a local storage device to satisfy data transfer commands. The removable storage slot adapter may generate responses to the data transfer command and send the responses to the physical device.

According to the present technology, the physical devices offered by the service provider environment in the physical device farm may be managed by an adapter management service hosted by the service provider environment. The adapter management service may manage access by the accounts of the service provider environment to the physical devices in the physical device farm using removable storage slot adapters inserted into the physical devices. The adapter management service may configure a removable storage slot adapter inserted into a physical device in the device farm for an account to present an emulated removable storage device to the physical device. The adapter management service may configure the removable storage slot adapter using a plurality of selectable machine images owned by the account. The adapter management service may configure the removable storage slot adapter to switch between machine images owned by the account. The removable storage slot adapter may switch on demand between a first block storage volume and a second block storage volume in the plurality of selectable block storage volumes owned by the account. For example, a switch between a first block storage volume and a second block storage volume may be made in response to a reboot of the device by the account.

The adapter management service may configure the same removable storage slot adapter inserted into the same physical device in the device farm for a different account to present a different emulated removable storage device to the same physical device. The adapter management service may configure the removable storage slot adapter using a plurality of selectable machine images owned by the different account. The adapter management service may configure the removable storage slot adapter for a second account in the service provider environment when the device is allocated to the second account.

According to another example of the present technology, the adapter management service may configure a removable storage slot adapter inserted into a physical device in the device farm to capture a machine image file for the physical device. A machine image file may be captured in response to a backup instruction received the removable storage slot adapter from the adapter management service. For example, when an account pauses usage of the physical device or no longer anticipates using the device, the adapter management service may capture a machine image of the device to collect the execution state of the device and any data used by the device. The removable storage slot adapter may send the machine image file over the network to the storage service for storage or archiving. In another example, when the account resumes usage of the physical device, the removable storage slot adapter may subsequently retrieve the machine image file from the storage service in response to a restore instruction received from the adapter management service. The removable storage slot adapter may resume operation of the physical device for the account using execution state and data in the machine image file.

The adapter management service may configure the same removable storage slot adapter inserted into the same physical device in the device farm for a different account to resume operation of the device for the different account. The adapter management service may configure the removable storage slot adapter, for example, to retrieve a machine image file for a second from the storage service in response to a restore instruction received from the adapter management service. The removable storage slot adapter may, for the second account, resume execution of an application on the physical device using the machine image file for the second account.

According to the present technology, an application development service hosted by the service provider environment may utilize removable storage slot adapters inserted into physical devices in a physical device farm. For example, a removable storage slot adapter inserted into a physical device in the device farm may be configured by the application development service hosted by the service provider environment to profile or test an application under development. An account of the service provider environment may utilize the application development service to develop one or more applications for execution using different types of physical devices in the device farm. The application development service may provide an integrated development environment (IDE) from which the account may deploy an application under development to one or more physical devices in the device farm using a removable storage slot adapter inserted into the physical device.

According to one example of the present technology, the application development service may send a removable storage configuration over the network to a removable storage slot adapter inserted into a physical device. The application development service may send the removable storage configuration for an application under development. The application development service may also send an application to the removable storage slot adapter. The removable storage slot adapter may present an emulated removable storage device to the physical device using the removable storage configuration and the application. The application development service may use the removable storage device adapter to deploy the application onto the physical device to profile and test the application with the physical device.

Emulated Block Storage for Physical Devices

FIG. 1 illustrates a system 100 and related operations that may implement emulated block storage for physical devices according to one example of the present technology. The system 100 may include a service provider environment 102. The service provider environment 102 may include one or more computing systems. The service provider environment 102 may employ virtualization that allows a single physical computing system, such as a server computer, to host multiple computing instances (e.g., virtual machines) using a hypervisor or another virtualization scheme. Each computing instance may be a virtual machine acting as a distinct logical computing system.

The service provider environment 102 may also include a physical device farm 104. The physical device farm 104 may include a service that lets customers having accounts within the service provider environment 102 test and interact with a variety of types of physical devices in real-time. The physical device farm 104 may include electronic devices (e.g., IoT devices or embedded devices) used in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. The physical device farm 104 may include electronic devices (e.g., IoT devices, etc.) useful for a number of applications, such as environmental monitoring, farming, infrastructure management, industrial applications, building and home automation, energy management, medical and healthcare systems, transport systems, etc. In addition, the physical device farm 104 may be located in a centralized data center, a telecommunications provider colocation building, in a secure information technology (IT) room, or in a closet of a business or another location where racks or physical enclosures for the physical device farm 104 may accessed using a network (e.g., using HTTP and TCP/IP protocols).

In this example, the physical device farm 104 includes a physical device 110 with a removable storage slot interface 112. The physical device 110 may include, for example, processor-based computing systems that include physical resources, such as a processor device, a memory device, a storage device, a network card, and the like. The physical device 110 may include, but is not limited to, a desktop computer, laptop or notebook computer, tablet computer, handheld computer, workstation, network computer, or other devices with like capability. In another example, the physical device 110 may include IoT devices. As non-limiting examples, the physical device 110 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over a network. Commercial devices may also be included in the definition of the physical device 110, including: commercial printing presses, commercial freezers, commercial kilns, commercial mixers, or other commercial equipment.

The physical device 110 may be other types of embedded devices that provide electronic controls for a machine or system. As such, the physical device 110 may include one or more components that provide IoT functionality, such as environmental sensors, image capture devices, industrial automation collection devices, and the like. The physical device 110 may further provide one or more services to devices having IoT functionality. The physical device 110 may also interface with devices having IoT functionality, for example, over a wired or wireless network (e.g., using Wi-Fi, 4G, or 5G protocols), message communications bus, and the like. In one example, the physical device 110 may provide communication services between devices that provide IoT functionality and the service provider environment 102. The physical device 110 may be a computing hub that forwards data generated by devices that provide IoT functionality to the services hosted by the service provider environment 102 for collection, aggregation, formatting, processing, storage, and the like. In another example, the physical device 110 may provide local data processing services for the data generated by devices that provide IoT functionality.

As illustrated in FIG. 1, the physical device 110 may include the removable storage slot 112. The removable storage slot 112 may be sized to physically receive removable storage devices that can be separated from the physical device 110. Typically, the physical device 110 may utilize the removable storages devices to provide the physical device 110 with block storage, data storage expansion, and/or data portability. Some examples of removable storage devices may include removable memory cards, such as Secure Digital (SD) cards, Compact Flash (CR) cards, USB flash drives, floppy disk drives, tape drives, and the like. The physical device 110 may be electronically connected to the removable storage devices using the removable storage slot 112, for example, with pads or pin connectors provided by the removable storage slot 112.

According to one example of the present technology, the service provider environment 102 may provide customers with accounts within the service provider environment 102 access to the physical device 110 via the physical device farm 104 using a removable storage slot adapter 120 physically inserted into the removable storage slot 112 of the physical device 110. A customer of the service provider environment 102 may acquire the exclusive or non-exclusive use of the physical device 110 via the removable storage slot adapter 120. Accordingly, the physical device farm 104 may manage the physical device 110 one behalf of multiple accounts of the service provider environment 102. Different customers may utilize the physical device 110 for a variety of purposes. For example, an account may utilize the physical device 110 to test operation of the physical device 110 with respect to one or more services provided by the service provider environment. In another example, an account may utilize the physical device 110 to test execution of an application that accesses the physical device 110. In a further example, an account may utilize the physical device 110 to execute or test execution of an application by the physical device 110.

In an example use of executing an application on a physical device 110, a network of security cameras may be provided in a network but a network controller for the cameras may need to be added to the camera network when demand for camera analysis is high (e.g., for routing video or for facial recognition). A removable storage slot adapter 120 that is located a slot of a network controller in a physical device farm 110 of a service provider environment may be loaded with a machine image and/or data to assist with managing the camera network and may be brought into the camera network upon demand using the virtual provisioning provided using the removable storage slot adapter 120.

When the physical device 110 is allocated for use by a given account, the physical device 110 may be controlled according to applications and data owned by the account. The physical device 110 may be managed on behalf of the accounts to present different hardware and software components using configurations associated with specific accounts. For example, the physical device 110 may include a range of hardware capabilities. The accounts may select a specific hardware capability for a component from a range of performance capabilities, for example, based on a desired performance of the component, expected utilization of the component, cost of using the hardware capability, and the like. Additionally, the physical device 110 may include a range of software services, for example, such as the collection, aggregation, formatting, processing, and storage services discussed above. According to one example of the present technology, multi-account access to the physical device 110 may be controlled by configuring the physical device 110 using emulated block storage interfaces inserted into removable storage slots. The emulated block storage interfaces may control, for example, which account the physical device 110 is allocated to, what hardware components are available, how a hardware capability is to be configured, what software components are available, how a software component is to be configured, and the like.

According to one example of the present technology, the service provider environment 102 may utilize an adapter management service 130, a machine image storage service 140, and a data store 150 to manage the physical device 110 using the removable storage slot adapter 120. The adapter management service 130, the machine image storage service 140, and the data store 150 may be hosted entirely or partially within the service provider environment 102 (e.g., in a data center of a service provider). The service provider environment 102 may further provide services, such as the adapter management service 130 and the machine image storage service 140, to the computing instances within the service provider environment 102 and to external computing systems and clients. Some additional examples of the services that may be provided by the service provider environment 102 may include compute services, data store services, networking services, web services, streaming services, platform as a service, software as a service, storage as a service, on-demand applications, services for the execution of code functions, and services associated with IoT functionality.

In one example configuration, the removable storage slot adapter 120 may be inserted into the removable storage slot 112 of the physical device 110. The removable storage slot adapter 120 may be utilized to control multi-account access to the physical device 110. The removable storage slot adapter 120 may include, for example, microcontroller-based computing systems sized to be inserted (e.g., in part or fully) into the removable storage slot 112 of the physical device 110. The removable storage slot adapter 120 may include physical resources, such as a microcontroller device, a memory device, a flash storage device, a removable storage slot interface, a wired or wireless network interface, and the like. The removable storage slot adapter 120 may be inserted into the removable storage slot 112 and electronically connected to the physical device 110 using, for example, pads or pin connectors of the removable storage device slot 112. The removable storage slot adapter 120 packaged, for example, as an SD memory card and inserted into the removable storage slot 112 of the physical device 110.

The removable storage slot adapter 120 may be powered via the memory interface of the removable storage slot adapter 120. For example, a power pin that is available for a removable memory device or card may be used to power the removable storage slot adapter 120. The removable storage slot adapter may also be powered by one or more batteries on a printed circuit board of the removable storage slot adapter 120. An external power supply may also be used to power the removable storage slot adapter 120. Examples of external power supplies may be external batteries, external solar power or an external power supply (rectified AC (alternating current) or DC (direct current) power) wired to the removable storage slot adapter 120.

The service provider environment 102 may provide multi-account access to the computing hub using the removable storage slot adapter 120, the adapter management service 130, and the machine image storage service 140. In other words, a first account may use the physical device 110 in the physical device farm 104 and then later a second account may use the physical device 110 after the physical device 110 has been erased, has been reloaded, and is available for use by another party in the physical device farm 104. The removable storage slot adapter 120 may obtain a configuration from the adapter management service 130. The configuration may include an emulated removable storage configuration document, such as an extensible markup language (XML) or a JavaScript objection notation (JSON) document. The removable storage slot adapter 120 may use the configuration to present an emulated removable storage device to the physical device 110. The adapter management service 130 may include software elements that allocate and configure the physical device 110 for use with accounts of the service provider environment 102. The adapter management service 130 may configure the physical device 110 using configuration data in the form of a removable storage configuration.

The adapter management service 130 may store one or more removable storage configuration(s) 152 in the data store 150. A customer having an account with the service provider environment 102 may interact with the adapter management service 130, for example, using a user interface, to construct one or more of the removable storage configuration(s) 152. The customer may copy one of removable storage configuration(s) 152 for use as a template to create other removable storage configurations. One or more of the removable storage configuration(s) 152 may be shared across accounts.

The adapter management service 130 may retrieve the removable storage configuration(s) 152 from the data store 150. The adapter management service 130 may send the removable storage configuration(s) 152 from the data store 150 to the removable storage slot adapter 120. For example, at the request of a customer having an account with the service provider environment 102, the adapter management service 130 may retrieve one of the removable storage configuration(s) 152 owned by the account and/or selected by the customer for use in configuring the computing device 110.

The removable storage configuration(s) 152 may include a set of parameters to control the removable storage slot adapter 120, the physical device 110, or combinations thereof. For example, removable storage configuration(s) 152 may include a set of emulation parameters that control an emulated removable storage device presented by the removable storage slot adapter 120 to the physical device 110. A device type parameter may specify a type of a removable storage device to be presented by the removable storage slot adapter 120 using the emulated removable storage device. In one example, the type parameter may indicate a type of memory card, such as an SD card, a CF card, a Memory Stick, and the like. In another example, the type parameter may indicate the type of the memory card within the same family of memory cards, such as a full-size, mini, or micro SD card. The set of emulation parameters may include storage size parameter that specifies a size of storage of a removable storage device to be presented by the removable storage slot adapter 120 using the emulated removable storage device. The size parameter may include a reference to a storage size, such as 4 GB, 8 GB, 16 GB, 32 GB, 64 GB, 128 GB, and 256 GB.

The set of emulation parameters may further include a device speed or class parameter that specifies a transfer speed of a removable storage device to be presented by the removable storage slot adapter 120 using the emulated removable storage device. The transfer speed parameter may indicate how a removable storage device is rated in terms of read and write speeds. The transfer speed parameter may indicate a "Speed Class," for example, like SD cards that can be rated as Class 2 (minimum write speed of 2 MB/s), Class 4 (4 MB/s), Class 6 (6 MB/s) or Class 10 (10 MB/s) and the like. The set of emulation parameters may also include additional parameters, such as a memory card manufacturer, a memory card security setting, and other memory card features such as device command sets, data transfer protocols, and the like.

The set of emulation parameters may include a machine image parameter that specifies one or more machine images. The machine image storage service 140 may store and retrieve one or more machine image(s) 154 from the data store 150. The machine image(s) 154 may include a template for the root volume of a removable storage device to be presented by the removable storage slot adapter 120 using the emulated removable storage device (for example, an operating system, an application server, and applications). The machine image(s) 154 may also include permissions that control accounts that can use machine image(s) 154 with the physical device 110. The machine image(s) 154 may include a block device mapping that specifies the volumes to attach to the physical device 110.

The removable storage slot adapter 120 may control an emulated removable storage device presented to the physical device 110 using the removable storage configuration(s) 152 and the machine image(s) 154. The removable storage configuration(s) 152 and the machine image(s) 154 may be one or more separate data structures or be combined into a single data structure or file for use by the removable storage slot adapter 120. The removable storage slot adapter 120 may configure the emulated removable storage device presented to the physical device 110 using the removable storage configuration(s) 152. The removable storage slot adapter 120 may populate a block storage volume of the emulated removable storage device presented to the physical device 110 using the machine image(s) 154.

Removable storage slot data 156 may also be stored in and retrieved from a data store 150 or thorough a data store service (e.g., a block oriented data storage service or an object data storage service). Block oriented data that is sent from the physical device 110 to the removable storage slot adapter 120 may be stored or written to the removable storage slot data 156 in the data store 150. The removable storage slot data 156 may be written to and read from using block level access. This block level storage may provide virtually unlimited amounts of data to the removable storage slot adapter 120 due to services provided by the data store 150 or data storage service.

In one example, security cameras may use space to write video data for storage. Thus, a large block level space may be provided using the removable storage slot adapter 120 and any video recorded by a camera (e.g., the physical device 110) may be written to the removable storage slot data 156 in the data store 150 using a storage service.

This technology can improve device environments where a very large number of devices are being manufactured that have limited embedded processing and networking capabilities. These devices are expected to number in the billions of devices. In addition, the number of types of devices is becoming greater and is increasing to the point where difficulties may arise in testing and developing the software and hardware for the large number of device permutations. In the past, device developers might obtain a physical copy of a device and then release software based on devices that could be physically obtained. However, developing and testing using a limited number physical devices does not typically account for the large number of real world device permutations and configurations in actual use. Using this technology, device developers may access, test and use devices that are in a physical device farm 104 which may not be physically accessible to developers but are valuable when testing and improving system for the device being developed. The value of such testing may also include the ability for testing or executing the device in a service provider environment with which the device is expected to interface or may actually be operating.

In a past example, a manufacturer of a device or hardware board may have sent thousands of pieces of development hardware to developers in advance of releasing the hardware being manufactured. Such test devices may have only been used for a limited time and may incur a significant cost to the device manufacturer that is viewed as a cost of doing business. The use of the present technology may enable a manufacturer to provide a large number of test devices in a physical device farm 104 and use the test devices to enable developers to work on many permutations of a device. Rather than each developer receiving the physical hardware, the developers may be allocated credit to use the test hardware devices for limited periods of time and test permutations of hardware and software without physically owning the device.

The temporary use of physical devices 110 may also be provided through a physical device farm 104. Computing workloads that may benefit from the temporary use of physical devices may include cryptocurrency, tensor product processing, transcoding, encryption and other processing intensive workloads that may use significant amounts of processing for limited amounts of time. Thus, physical devices may allocated to a customer from the physical device farm 104, may be configured via the removable storage slot adapter 120 and may then be released for other uses when a customer has finished using the physical device.

This technology provides valuable enhancements to computing environments due to providing storage as an interface which enables access to data stored in a service provider environment or another location accessible through computer networks. The use of the removable storage slot adapter 120 may enable a device be part of a grid or a physical device farm 104. Devices in the physical device farm can be accessed by customers of a service provider environment (e.g., for a specific time period and/or for a fee) or on-premises customers to enable implementation of applications or testing of software on devices in a networked environment.

A removable storage slot adapter 120 may also be used in a health care setting. In hospitals and other health care settings, there are many devices (e.g., patient monitors, drug delivery devices, etc.) that may have removable storage or removable storage drives but these devices do not have network connectivity and are not connected or controllable from a network. The removable storage slot adapter 120 may be used in the removable storage slots of such health care devices. The data storage service accessed by the removable storage slot adapter 120 in such configurations may access on-premises storage that is provided by a hospital or health care location. For example, network attached storage (NAT) or a storage area network (SAN) may be use as the on-premises backing data service that is accessible to the removable storage slot adapter 102 over a network. The use of this technology in health care devices may result in converting non-network enabled devices to devices that are network enabled in the sense that the removable memory used by the device may be modified using data stored in a central location. A similar process may be used in other industries (e.g., manufacturing, packaging, farming, etc.) to provide some on-premises network connectivity to devices that may not have had any network connectivity in the past.

Figure 2:
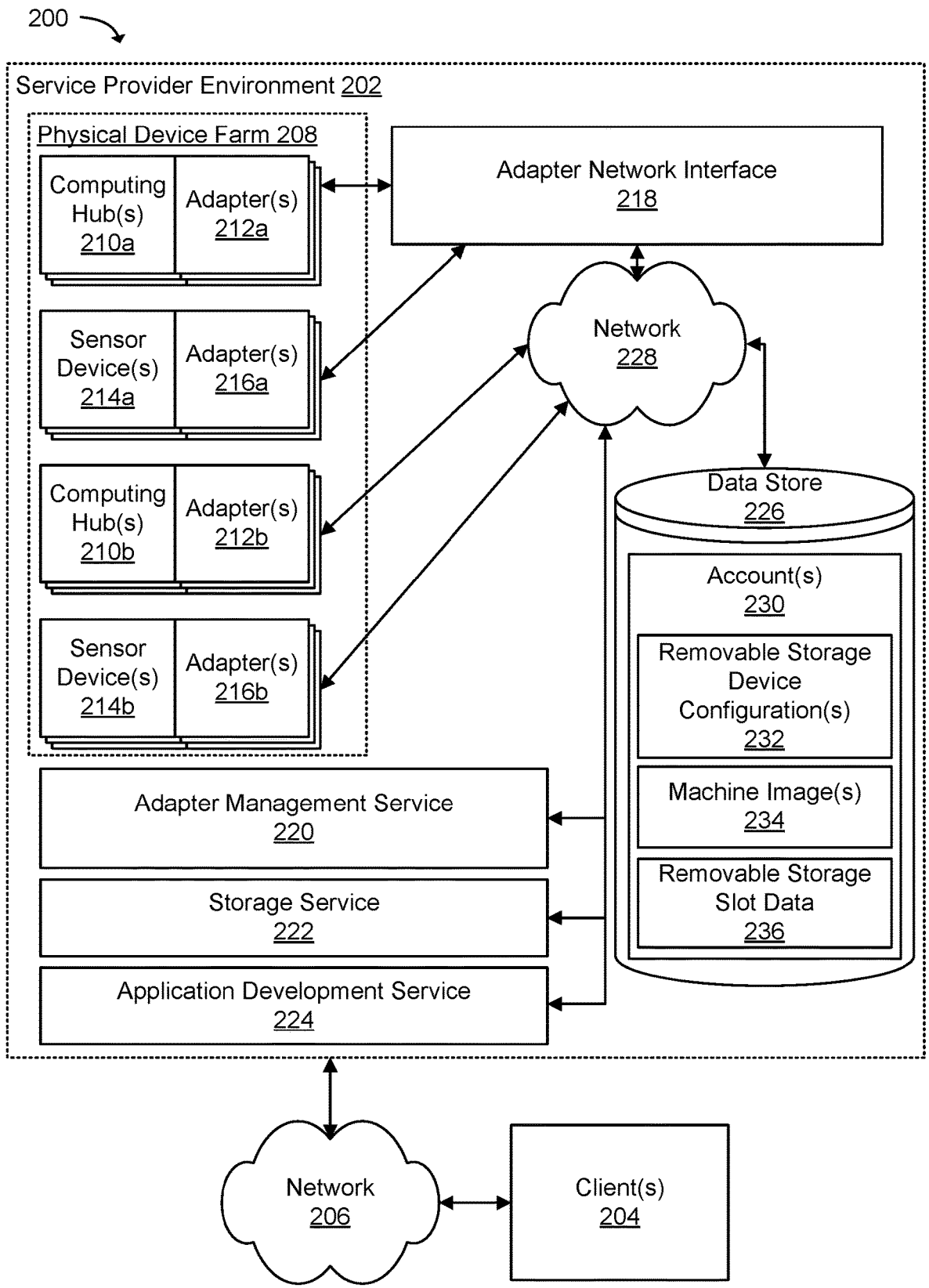
FIG. 2 is a block diagram illustrating an example system for emulated block storage for physical devices within a service provider environment according to one example of the present technology.

FIG. 2 is a block diagram illustrating an example system 200 for emulated block storage for physical devices within a service provider environment 202 according to one example of the present technology. System 200 may include the service provider environment 202 and one or more client device(s) 204 in communication using a network 206. The service provider environment 202 may include one or more computing systems. The service provider environment 202 may employ virtualization that allows a single physical computing system, such as a server computer, to host multiple computing instances (e.g., virtual machines) using a hypervisor or another virtualization scheme. Each computing instance may be a virtual machine acting as a distinct logical computing system.

The service provider environment 202 may include a physical device farm 208 having one or more computing hub(s) 210a-210b, one or more removable storage slot adapters such as adapter(s) 212a-212b, one or more sensor device(s) 214a-214b, and one or more removable storage slot adapters such as adapter(s) 216a-216b. The service provider environment 202 may include an adapter network interface 218, an adapter management service 220, a storage service 222, an application development service 224, a data store 226, and a network 228.

Each of the computing hub(s) 210a-210b may have at least one of the removable storage slot adapter(s) 212a-212b inserted into a removable storage slot. Each of the sensor device(s) 214a-214b may have at least one of the removable storage slot adapter(s) 216a-212b inserted into a removable storage slot. The removable storage slot adapter(s) 212a, 216a may be directly connected to the adapter network interface 218, for example using a universal serial bus (USB) interface, a parallel communications interface, wired network interface, wireless network interface, and the like. The adapter network interface 218 may provide network communication between removable storage slot adapters without built-in networking facilities (e.g., the removable storage slot adapter(s) 212a, 216a) and the adapter management service 220 and the storage service 222. As illustrated, the removable storage slot adapter(s) 212b, 216b may alternatively be directly connected to the network 228 to communicate with the adapter management service 220 and the storage service 222.

According to one example of the present technology, the adapter management service 220 may control multi-account access to the computing hub(s) 210a-210b and the sensor device(s) 214a-214b using the removable storage slot adapter(s) 212a-212b, 216a-216b. The adapter management service 220 may allocate one or more of the computing hub(s) 210a-210b and the sensor device(s) 214a-214b to the accounts 230 of the service provider environment 202. The adapter management service 220 may send one or more of the removable storage configuration(s) 232 in the data store 226 to the removable storage slot adapter(s) 212a-212b, 216a-216b. The removable storage slot adapter(s) 212a-212b, 216a-216b may then control and present an emulated removable storage device presented to the computing hub(s) 210a-210b and the sensor device(s) 214a-214b using the removable storage configuration(s) 232. The removable storage slot adapter(s) 212a-212b, 216a-216b may populate block storage volumes of the emulated removable storage devices using one or more machine image(s) 234 in the data store 226. The removable storage slot adapter(s) 212a-212b, 216a-216b may read and write data associated with the machine image(s) 234 using the storage service 222. In some configurations, the data from the removable storage slot adapter(s) 212a-212b, 216a-216b may populate block storage volumes of the emulated removable storage devices using one or more individual blocks read from the removable storage slot data 236. In addition, data blocks from the removable storage slot adapter(s) 212a-212b, 216a-216b may be written in block form to the removable storage slot data 236 providing a virtually unlimited amount of storage for a physical device.

The application development service 224 may enable the account(s) 230 to build and test applications using the computing hub(s) 210a-210b and the sensor device(s) 214a-214b. The applications can be deployed to the computing hub(s) 210a-210b and the sensor device(s) 214a-214b using the removable storage slot adapter(s) 212a-212b, 216a-216b. The application development service 224 may present an integrated development environment (IDE) to enable the account(s) to select which of the computing hub(s) 210a-210b and the sensor device(s) 214a-214b to use for application development. The application development service 224 (or the adapter management service 220) may create one or more of the removable storage configuration(s) 232 to facilitate deployment of an application under development or test. The removable storage slot adapter(s) 212a-212b, 216a-216b may then control an emulated removable storage device presented to the computing hub(s) 210a-210b and the sensor device(s) 214a-214b using the removable storage configuration(s) 232. The removable storage slot adapter(s) 212a-212b, 216a-216b may populate block storage volumes of the emulated removable storage devices using one or more machine image(s) 234 in the data store 226 or groups of data blocks from removable storage slot data 236, which may include the application under development.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 226 may include storage systems such as a SAN (Storage Area Network), cloud storage network, volatile or non-volatile RAM, optical media, or hard-drive type media. The data store 226 may be representative of a plurality of data stores as can be appreciated.

The network 206 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 3:
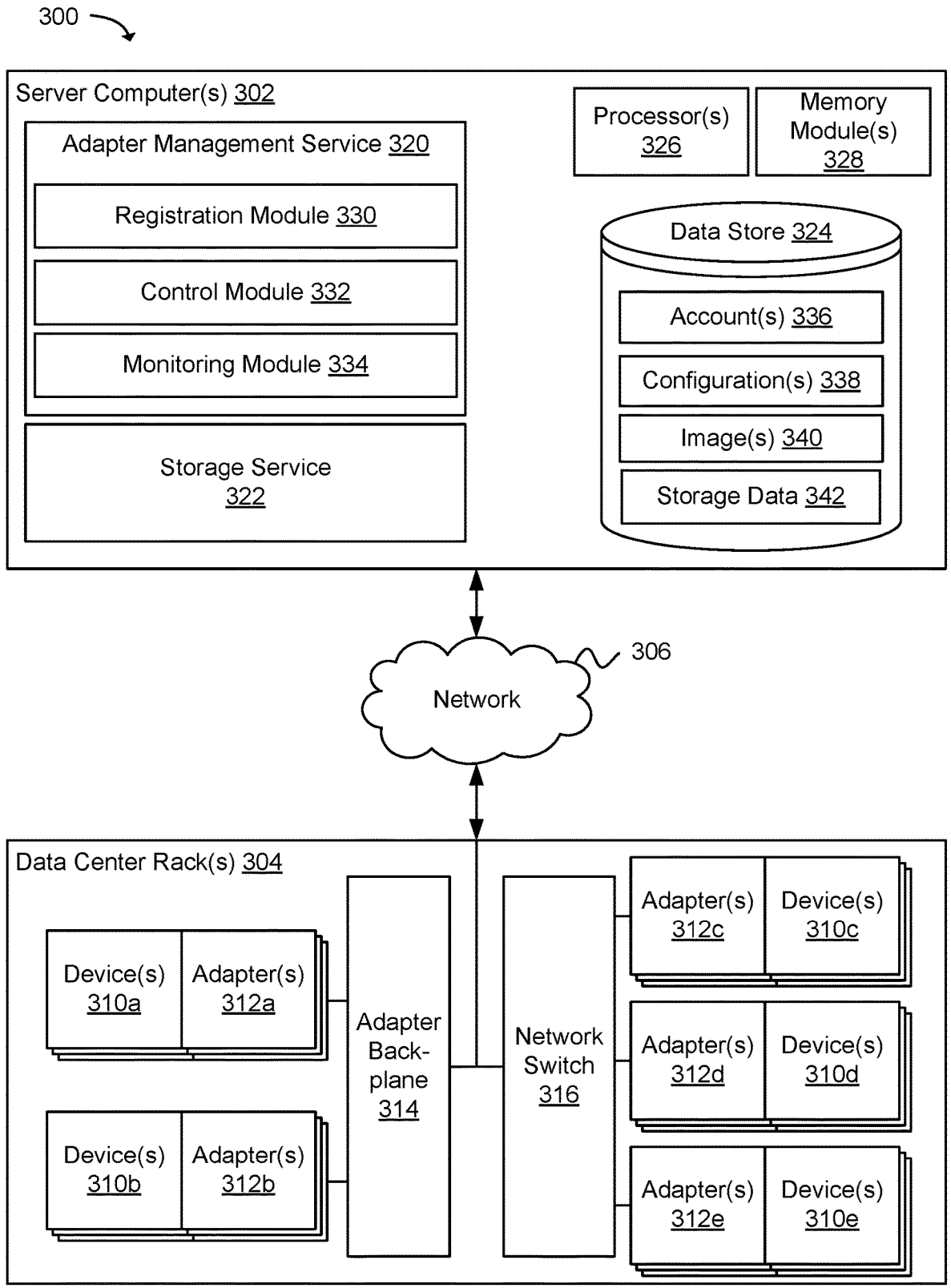
FIG. 3 illustrates various example components included in a system using emulated block storage for physical devices according to one example of the present technology.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting FIG. 3 illustrates various example components included in a system 300 for block storage interfaces according to one example of the present technology. The system 300 may include one or more server computer(s) 302 that located in one or more data center rack(s) 304 and the server computers 320 may be accessible via a network 306. The server computer(s) 302 may contain one or more services used in managing multi-account access to devices, such as devices providing IoT functionality.

The data center rack(s) 304 may include one or more device(s) 310a-310e each having one or more removable storage slot adapter(s) 312a-312e inserted into a removable storage slot. Some of the device(s) 310a-310e, such as the device(s) 310a-310b may be connected to an adapter backplane 314 using the adapter(s) 312a-312b. The adapter backplane 314 may provide an interface from the adapter(s) 312a-312b which lack networking capabilities to the server computer(s) 302 using the network 306. The remaining device(s) 310c-310e may be connected to a network switch 316 using the adapter(s) 312c-312e. The network switch 316 may provide communication between the adapter(s) 312c-312e, which include networking capabilities, and the server computer(s) 302 using the network 306.

In one example, the services provided by the server computer(s) 302 may include an adapter management service 320, a storage service 322, and a data store 324. The adapter management service 320 may include a registration module 330, a control module 332, and a monitoring module 334. The data store 324 may include one or more account(s) 336, one or more removable storage configuration(s) 338, one or more image(s) 340, and storage data 342 to store block data from adapters 312a-312b.

The registration module 330 may provide registration functionality for adding or removing one or more of the device(s) 310a-310e from multi-account access. An administrator may input information into the registration module 330 about a device into which a removable storage slot adapter has been inserted. The registration module 330 may confirm communication with the removable storage slot adapter over the network 306 and add the device to a pool of devices available for use by the account(s) 336.

The control module 332 may provide for the allocation and configuration of one or more of the device(s) 310a-310e from multi-account access. The control module 332 may coordinate which of the account(s) 336 may access the device(s) 310a-310e, when the account(s) 336 may access the device(s) 310a-310e, how many of the device(s) 310a-310e may be allocated to an account, and the like.

The monitoring module 334 may provide the collection of metrics and status from the device(s) 310a-310e. The monitoring module 334 may provide usage information to the control module 332 to enable the control module 332 to manage access by individual accounts and across multiple accounts.

Figure 4:
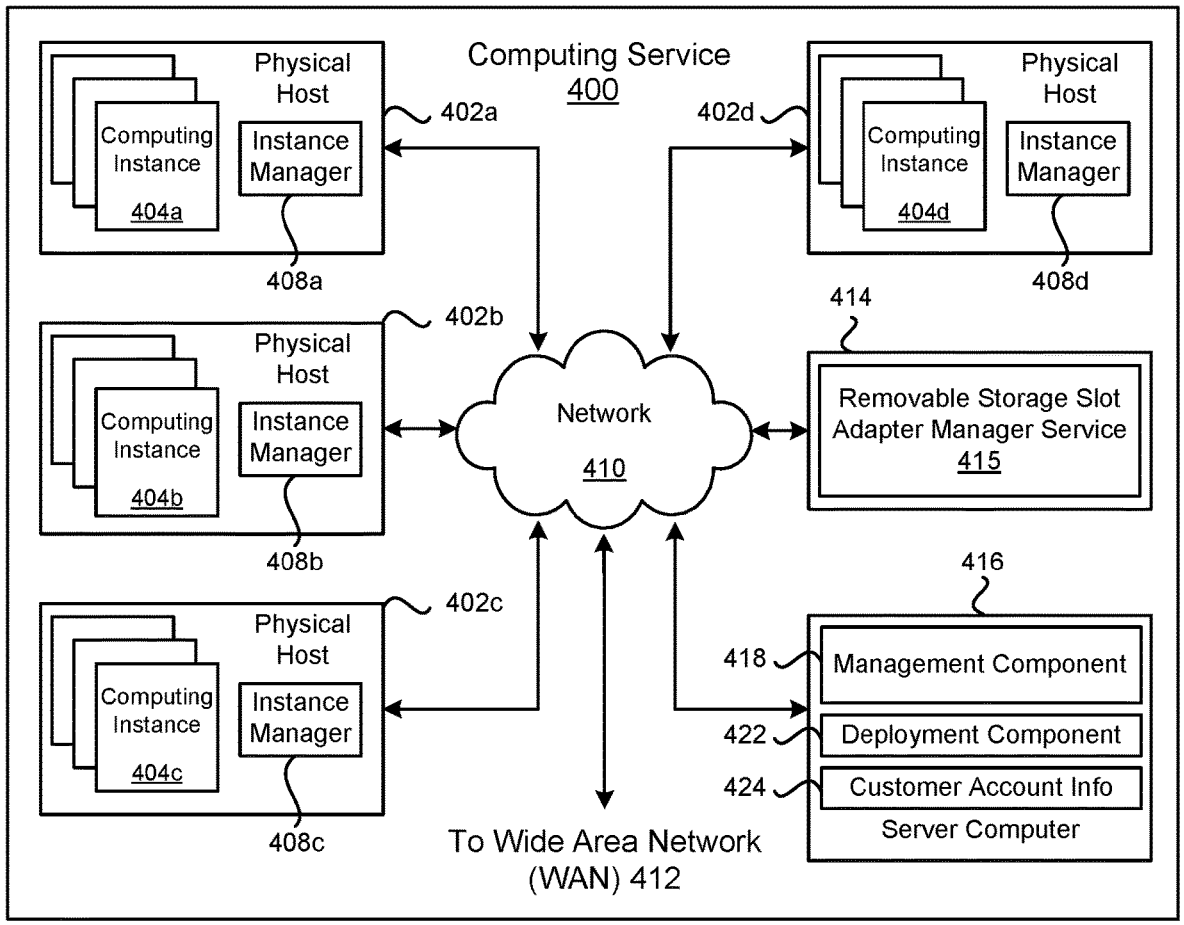
FIG. 4 is a block diagram that illustrates an example computing service that includes a removable storage slot adapter manager service according to one example of the present technology.

FIG. 4 is a block diagram that illustrates an example computing service 400 that includes an adapter manager module for removable storage slots according to one example of the present technology. The computing service 400 may be used to execute and manage a number of computing instances 404a-d upon which the present technology may execute. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage, and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. The server computers 402a-d may also be known as physical hosts. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine manager (VMM), or another type of program configured to enable the execution of multiple computing instances 404a-d on a single server. Additionally, each of the computing instances 404a-d may be configured to execute one or more applications.

A server computer 414 may be reserved to execute software components for implementing the present technology or managing the operation of the computing service 400 and the computing instances 404a-d. For example, the server computer 414 may execute an adapter manager module 415a operable to manage block storage interfaces for devices using removable storage slot adapters and multi-account access to the devices according to the present technology.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache is to be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. In addition, the network 410 may include a virtual network overlaid on the physical network to provide communications between the server computers 402a-d. The network topology illustrated in FIG. 4 has been simplified, as many more networks and networking devices may be utilized to interconnect the various computing systems disclosed herein.

Removable Storage Slot Adapter

Figure 5:
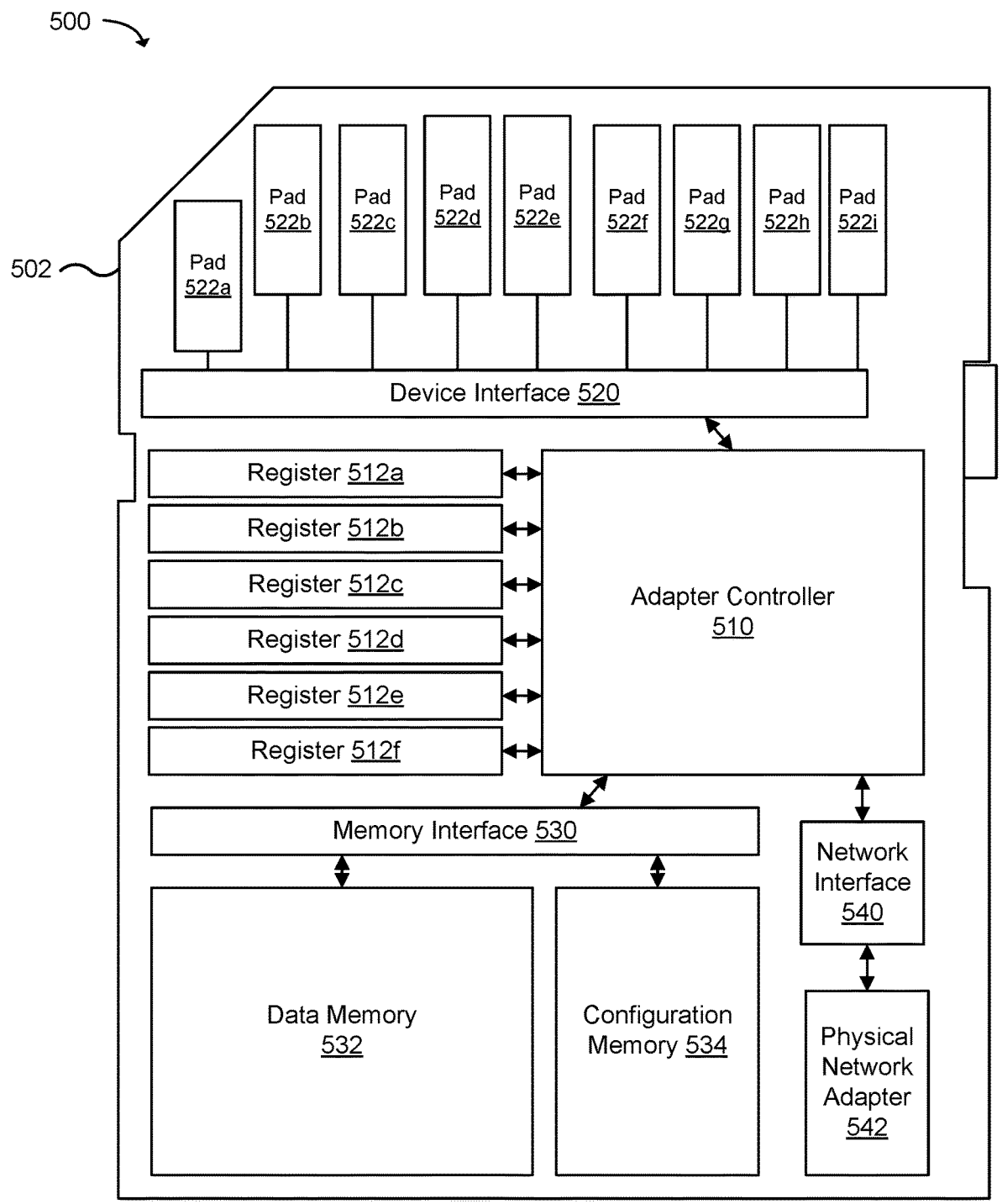
FIG. 5 is a block diagram that illustrates various example components included in a removable storage slot adapter according to one example of the present technology.

FIG. 5 is a block diagram that illustrates various example components included in a removable storage slot adapter 500 according to one example of the present technology. In this example, the removable storage slot adapter 500 includes packaging 502. The packaging 502 is physically sized to be inserted into one or more removable storage devices slots. As illustrated, the packaging 502 conforms to the physical outline of a full-sized SD card. The removable storage slot adapter 500 further includes an adapter controller 510, registers 512a-512f, a device interface 520, device interface pads 522a-522i, a memory interface 530, data memory 532, configuration memory 534, and a service interface 540.

The adapter controller 510 may include one or more microprocessors. The adapter controller 510 may be a system on a chip (SoC) and include a processor, volatile random access memory (RAM), non-volatile read only memory (Flash/ROM), analog-to-digital converters (ADCs), general purpose input-output circuitry (GPIO), and the like. The adapter controller 510 may be programmed using firmware to receive a removable storage configuration and present an emulated removable storage device to a device into which the removable storage slot adapter 500 is inserted.

The registers 512a-512f may be memory devices that store status information generated by the adapter controller 510. The registers 512a-512f may be used to indicate the status of the emulated removable storage device. The adapter controller 510 may read one or more of the registers 512a-512f in response to interpreting one or more commands. The adapter controller 510 may generate a response to interpreting the commands using the contents of the registers 512a-512f According to one example of the present technology, the registers 512a-512f may be used to indicate the current configuration or machine image associated with the emulated removable storage device presented by the removable storage slot adapter 500. The adapter controller 510 may switch between different configurations and/or machine images by setting one or more of the registers 512a-512f. In one example, the adapter controller 510 may switch between a first machine image and a second machine image by setting one or more of the registers 512a-512f and causing the device into which the removable storage slot adapter 500 is inserted to reboot. In another example, the adapter controller 510 may switch between a first removable storage configuration and a second removable storage configuration by setting one or more of the registers 512a-512f and triggering an event indicating removal of a removable storage device and another event indicating insertion of a removable storage device.

The device interface 520 may include circuitry that interfaces between the adapter controller 510 and the device into which the removable storage slot adapter 500 is inserted using the pads 522a-522i. Each of the pads 522a-522i may be designated for a specific electrical connection with the device. One or more of the pads 522a-522i may provide a Vcc or a ground reference. One or more of the pads 522a-522i may provide a clock signal. Some of the pads 522a-522i may provide data lines for parallel or serial communication.

The memory interface 530 may include circuitry that interfaces between the adapter controller 510 and the data memory 532 and the configuration memory 534. The data memory 532 and the configuration memory 534 may be provided by a single memory core or by separate memory cores. The memory interface 530 may provide access to a single type of memory, different types of memory, combinations of volatile and non-volatile memory, and the like.

The adapter controller 510 may access the data memory 532 through the memory interface 530 to utilize the data memory 532 as a storage device. For example, the adapter controller 510 may utilize the data memory 532 to store data blocks obtained over a network from a storage service hosted by a service provider environment. The adapter controller 510 may stream data from a network location for storage in the data memory 532. The adapter controller 510 may populate a block storage volume of an emulated removable storage device using data blocks stored in the data memory 532. In another example, the adapter controller 510 may control read and write access to the data memory 532. The adapter controller 510 may mark data blocks stored in the data memory 532 as read-only. The adapter controller 510 may partition the data memory 532 into read-only and read/write sections.

The adapter controller 510 may access the configuration memory 534 through the memory interface 530 to utilize the configuration memory 534 as a storage device. For example, the adapter controller 510 may access the configuration memory 534 through the memory interface 530 to store removable storage configurations. The adapter controller 510 may obtain the removable storage configurations from an adapter management service hosted by a service provider environment and store the removable storage configurations in the configuration memory 534. The adapter controller 510 may read the removable storage configurations from the configuration memory 534 to emulate block storage to physical devices with which the removable storage slot adapter 500 is connected or into which the removable storage slot adapter 500 is inserted.

The service interface 540 may include logic that interfaces between the adapter controller 510 and one or more services external to the removable storage slot adapter 500. The service interface 540 may interact with a physical network adapter 542 which may include a bus interface, a communications interface, a network interface, and the like. In one example, the physical network adapter 542 may include an electrical connection or circuitry, such as an adapter network interface (e.g., 218 of FIG. 2), that enables communication with one or more services hosted by a service provider environment. In another example, the physical network adapter 542 may provide a universal serial bus interface to a host computer. In yet another example, the physical network adapter 542 may include an Ethernet or fiber optic network connection to a local area network.

In an alternative configuration, the components illustrated may be part of a system on a chip (SOC). The components and functions illustrated in FIG. 5 may integrated in a single chip or printed circuit board to be able to natively connect to a storage service that is accessible via a network or is hosted in a service provider environment. This may include the ability to receive machine images or data wirelessly and the wireless networking components may be part of the system on a chip (SOC).

Configuring and Accessing Emulated Removable Storage Devices

Figure 6:
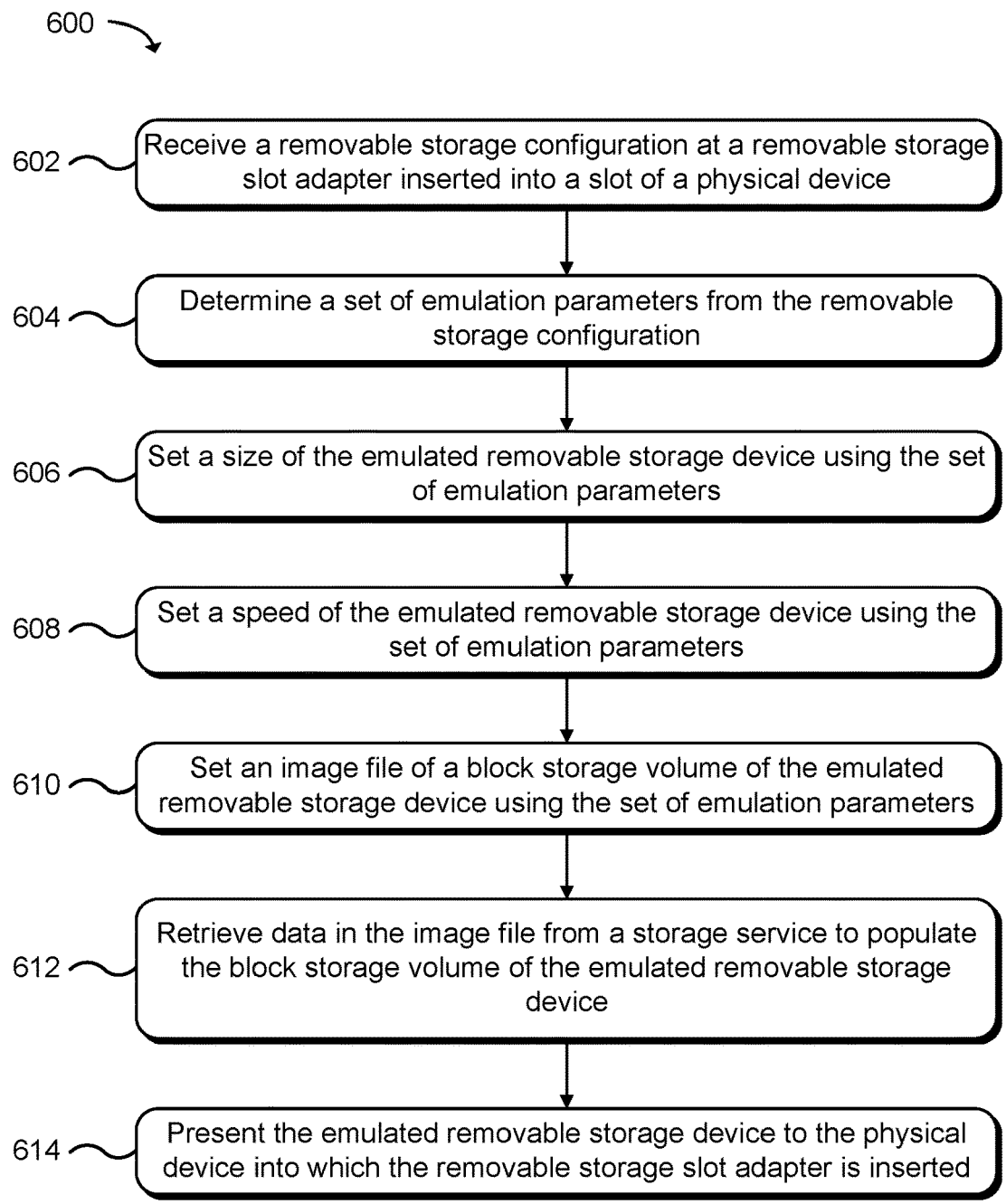
FIG. 6 is a flowchart of a method for presenting emulated block storage to a physical device using a removable storage slot adapter according to one example of the present technology.

FIG. 6 is a flowchart of a method 600 for presenting emulated block storage to a physical device using a removable storage slot adapter according to one example of the present technology. The method 600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 600 enables a removable storage slot adapter to present an emulated removable storage device to a device into which the removable storage slot adapter is inserted.

In operation 602, a removable storage slot adapter inserted into a slot of a physical device may receive a removable storage configuration. The removable storage slot adapter may receive the removable storage configuration over a network interface, a bus interface, and the like from one or more sources in a service provider environment. The removable storage slot adapter may receive the removable storage configuration from an adapter management service hosted by the service provider environment and may be configured to control multi-account access to the device using the removable storage slot adapter.

In operation 604, the removable storage slot adapter may determine a set of emulation parameters from the removable storage configuration. The removable storage slot adapter may parse a configuration document, such as an extensible markup language (XML) or a JavaScript objection notation (JSON) document to identify a set of emulation parameters. The removable storage slot adapter may determine a memory card size parameter that specifies a storage size associated with a removable storage device. The removable storage slot adapter may determine a memory card speed parameter that specifies read and write transfer speeds of a removable storage device. Further, the removable storage slot adapter may determine information identifying a memory card manufacturer, memory card security settings, and other memory card features that may be used to emulate a removable storage device. In addition, the removable storage slot adapter may set a status register or memory location with a value for each parameter in the set of emulation parameters associated with an emulated removable storage device.

In operation 606, the removable storage slot adapter may set a size of the emulated removable storage device using the set of emulation parameters. In one example, the removable storage slot adapter may set the storage size of the emulated removable storage device. In another example, the removable storage slot adapter may infer the storage size of the emulated removable storage device from a type or description of a removable storage device in the set of emulation parameters. To set the size, the removable storage slot adapter may construct one or more memory mappings between an address space of the size specified in the set of emulation parameters and data storage locations or data accessible to the removable storage slot adapter, such as in local flash storage or in a storage service accessible over a network.

In operation 608, the removable storage slot adapter may set a speed of the emulated removable storage device using the set of emulation parameters. The removable storage slot adapter may set or limit the speed at which commands received from the device are handled or processed and set or limit the speed at which data is supplied to the device. The removable storage slot adapter may set the speed in order to simulate usage of actual removable storage devices with the device in real world scenarios. The removable storage slot adapter may set the data transfer rate at which data is read from or written to the emulated removable storage device, and the like. The removable storage slot adapter may set symmetric or asymmetric speeds for inbound and outbound transfers.

In operation 610, the removable storage slot adapter may set an image file of a block storage volume of the emulated removable storage device using the set of emulation parameters. The removable storage slot adapter may obtain a filename, uniform resource locator (URL), or other reference to the image file from the set of emulation parameters. The removable storage slot adapter may construct the filename(s), the uniform resource locator (URL), or other reference to the image file from the set of emulation parameters. The removable storage slot adapter may set the image file by selecting between a first machine image of a first configuration already loaded onto the removable storage slot adapter and a second machine image of a second configuration already loaded onto the removable storage slot adapter.

In operation 612, the removable storage slot adapter may retrieve data in the image file from a storage service hosted by the service provider environment to populate the block storage volume of the emulated removable storage device. The removable storage slot may obtain one or more data blocks from the storage service hosted by the service provider environment. The removable storage slot adapter may send a request to the storage service over a network in order to retrieve the data. The removable storage slot adapter may retrieve a machine image from the storage service that includes a template for the block storage volume. The template may include one or more references to data to be included in the block storage volume, such as an operating system kernel, operating system applications and libraries, and additional applications, and how to arrange files in a file system. The removable storage slot adapter may retrieve the template to load the block storage volume to the device with the actual data. The removable storage slot adapter may delay populating the emulated removable storage volume with the actual data until a request for the data is made by the device.

In operation 614, the removable storage slot adapter may present the emulated removable storage device to the device into which the removable storage slot adapter is inserted. The removable storage slot adapter may set one or more status registers, which upon being read by the device, indicate to the device the type, size, speed, class, etc. of the emulated removable storage device. The removable storage slot adapter may actively indicate to the device the type, size, speed, class, etc. of the emulated removable storage device. The removable storage slot adapter may respond to the device with the type, size, speed, class, etc. of the emulated removable storage device.

Accordingly, the removable storage slot adapter may control the removable storage slot of the device to provide raw block-level storage that can be dynamically attached to the device. The emulated removable storage device presented by the removable storage slot adapter can then be used like a traditional raw block device. In a typical use case, this may include formatting the emulated removable storage device with a filesystem, mounting the filesystem, and issuing commands to the file systems, such as read and write commands. In addition, as the removable storage slot adapter controls the emulated removable storage device, the removable storage slot adapter can support a number of advanced storage features, including snapshotting and cloning. Moreover, the removable storage slot adapter can support emulated removable storage devices in sizes greater than those of physical removable media.

Figure 7A:
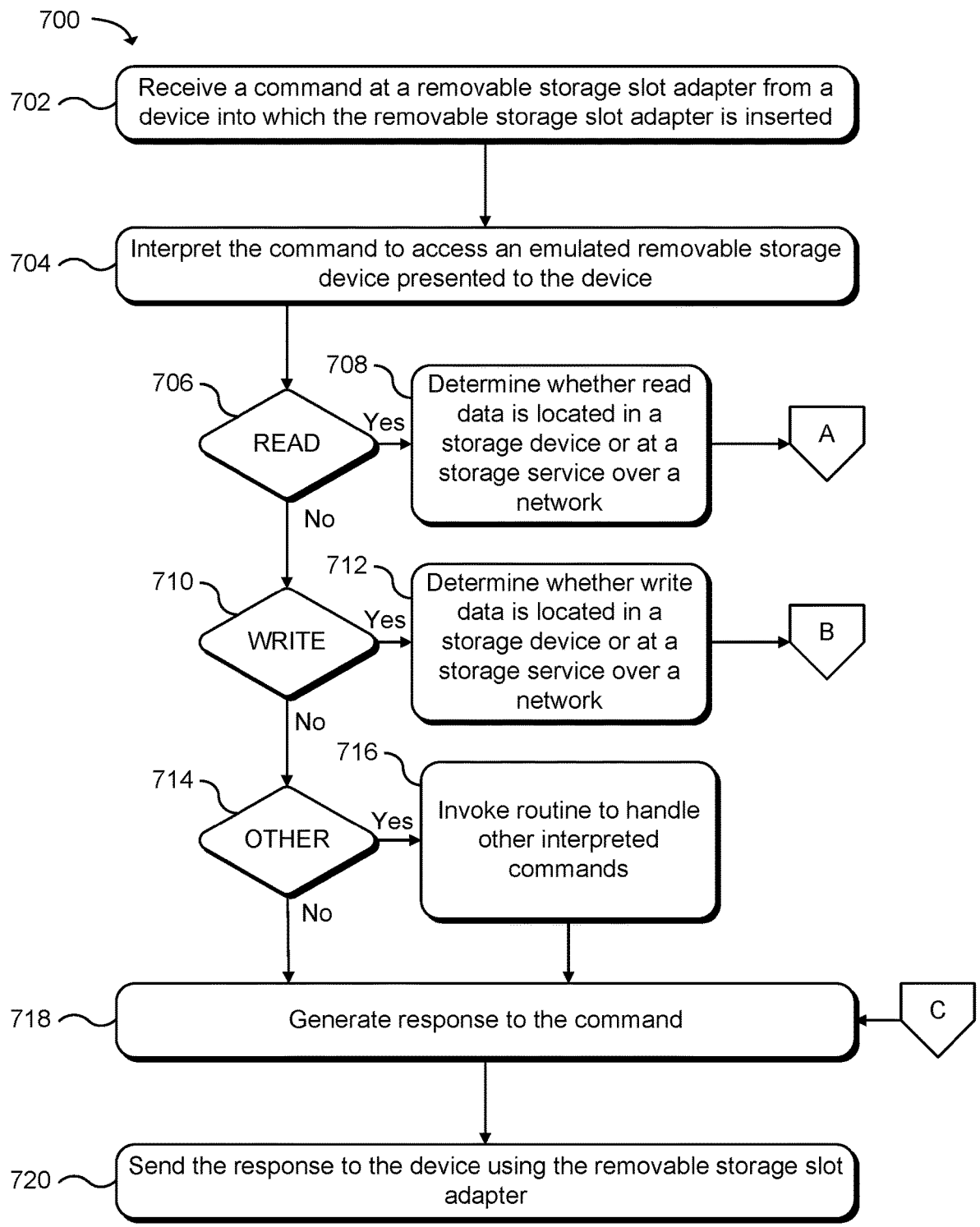
FIGS. 7A-7C are flowcharts of a method for accessing emulated block storage presented to a physical device using a removable storage slot adapter according to one example of the present technology.
Figure 7B:
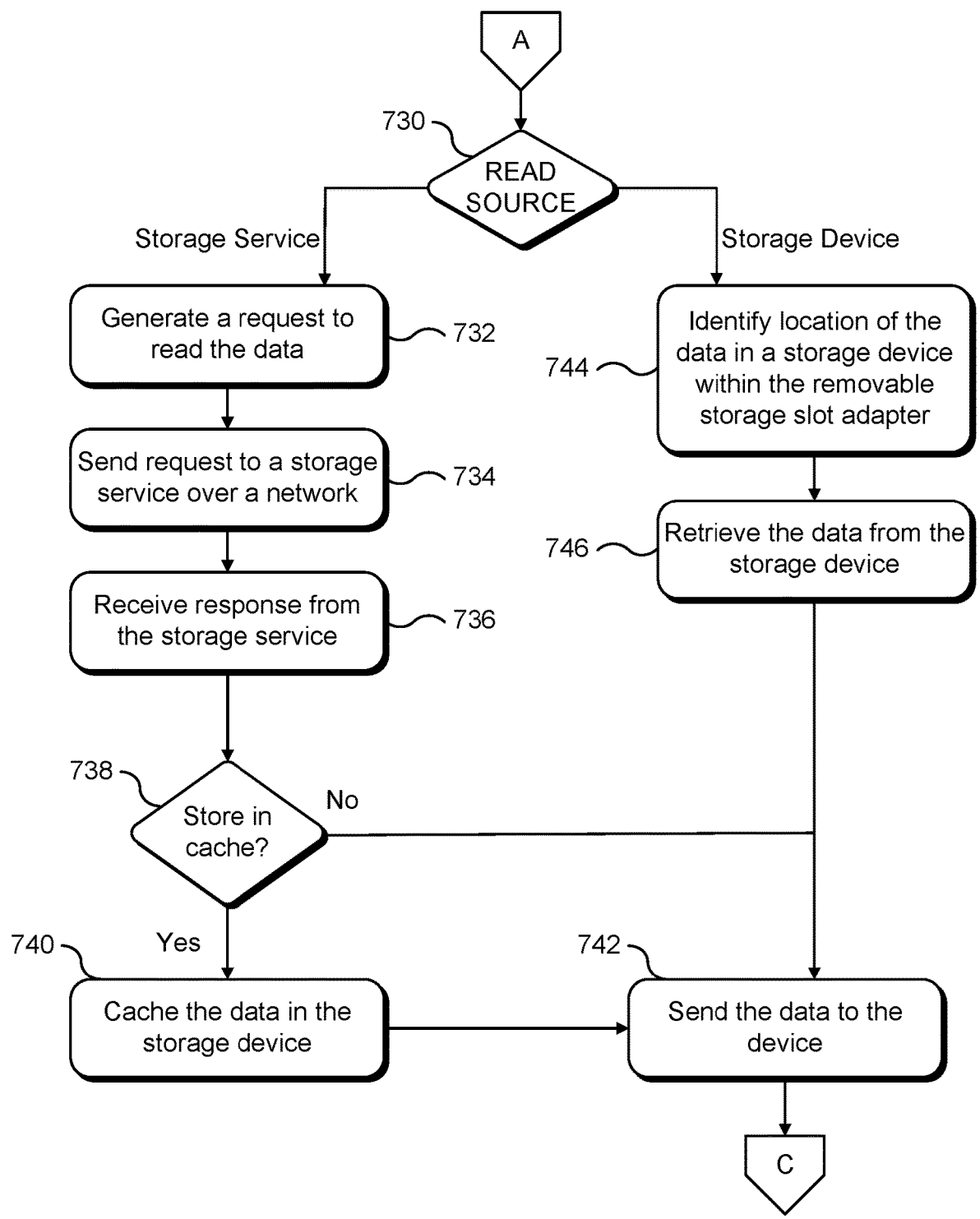
Figure 7C:
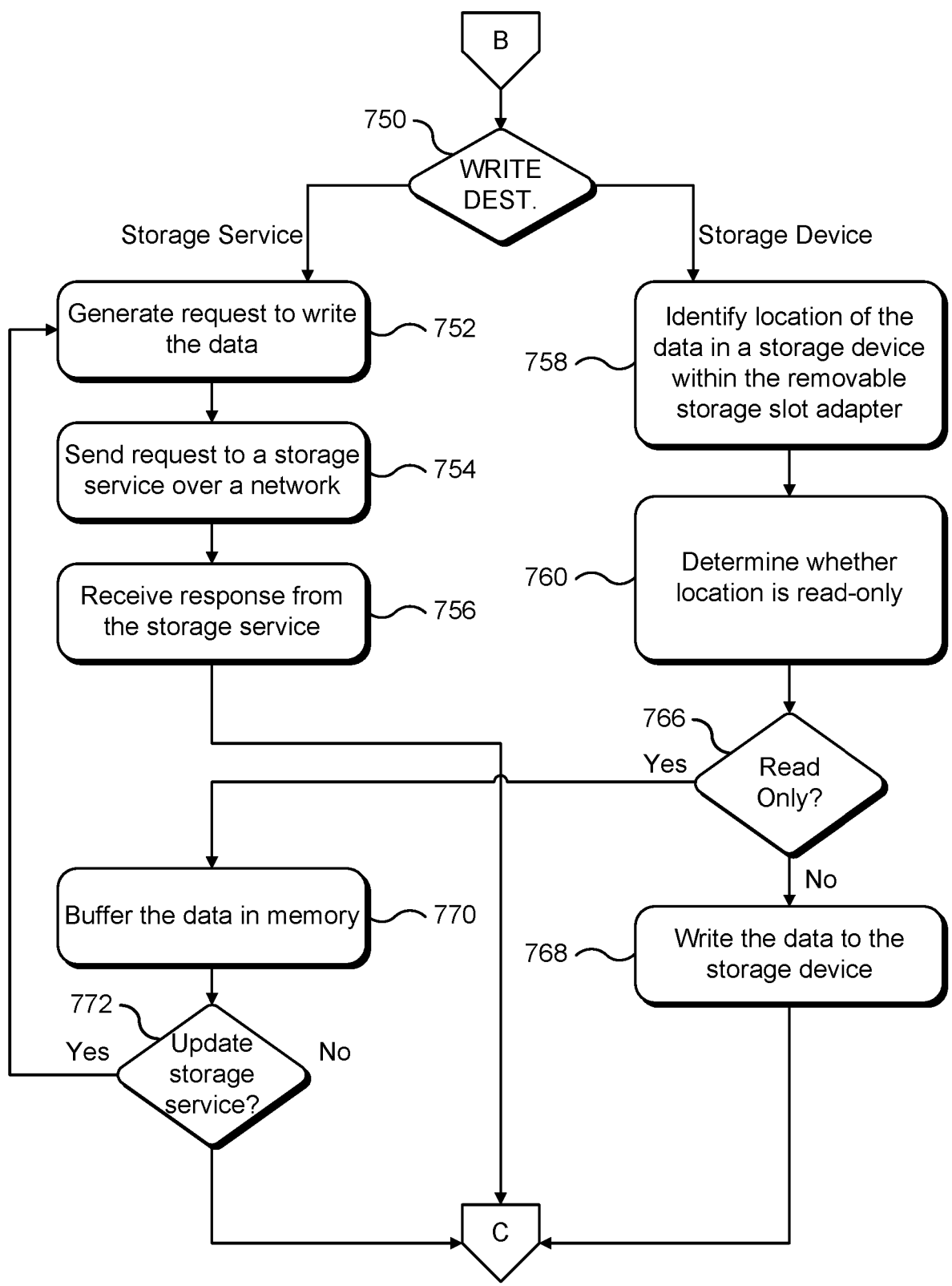

FIGS. 7A-7C are flowcharts of a method 700 for controlling an emulated removable storage device presented to a device using a removable storage slot adapter an according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 700 enables a removable storage slot adapter to control an emulated removable storage device using interpreted commands to respond to commands issued by a device into which the removable storage slot adapter is inserted.

In operation 702, a removable storage slot adapter may receive a command from a device into which the removable storage slot adapter is inserted. The removable storage slot adapter may receive the command over a removable storage device interface, a memory card interface, a bus interface, and the like. The removable storage slot adapter may receive the command using a removable storage device protocol. Some examples of removable storage device protocols may include the MultiMediaCard (MMC) card protocol, the Secure Digital (SD) card protocol, the Serial Peripheral Interface protocol, and the like.

In operation 704, the removable storage slot adapter may interpret the command to control an emulated removable storage device presented to the device into which the removable storage slot adapter is inserted. The removable storage slot adapter may interpret the command to determine how the command applies to the emulated removable storage device. The removable storage slot adapter may parse the command to determine one or more command elements, such as command identifiers, command arguments, cyclical redundancy check (CRC) data, and the like. The removable storage slot adapter may interpret the command according to the identified command elements.

If the command is a "READ" command in operation 706, the removable storage slot adapter may interpret the command to read data from the emulated removable storage device. In operation 708, the removable storage slot adapter may determine whether the data requested to be read by the command (i.e., the "read data") is located in a storage device within the removable storage slot adapter or at a storage service over a network. In one example, the removable storage slot adapter may interpret the command to control the emulated removable storage device to respond with data read from the storage device. In another example, the removable storage slot adapter may interpret the command to control the emulated removable storage device to respond with data requested and retrieved from the storage service over the network. The method 700 continues in FIG. 7B starting with block "A," which will be discussed further below.

If the command is a "WRITE" command in operation 710, the removable storage slot adapter may interpret the command to write data to the emulated removable storage device. In operation 712, the removable storage slot adapter may determine whether the data requested to be written by the command (i.e., the "write data") is located in a storage device within the removable storage slot adapter or at a storage service over a network. In one example, the removable storage slot adapter may interpret the command to control the emulated removable storage device to respond to the data write by writing to the storage device. In another example, the removable storage slot adapter may interpret the command to control the emulated removable storage device to respond to the data write by sending the data to the storage service over the network. The method 700 continues in FIG. 7C starting with block "B," which will be discussed further below.

If the command is an "OTHER" command in operation 714, the removable storage slot adapter may interpret the command to handle the command with respect to the emulated removable storage device. In operation 716, the removable storage slot adapter may invoke a routine to handle the other interpreted commands. Other interpreted commands may include status request commands, erase commands, card protection commands, application specific commands, and the like.

In operation 718, the removable storage slot adapter may generate a response to the command. The removable storage slot adapter may generate a response to the command using the native protocol of the device or the expected protocol of the removable storage slot. The response may include a command-specific response sent separately, for example, from any requested data. In operation 720, the removable storage slot adapter may send the response to the device.

Referring to FIG. 7B, the method 700 continues starting with block "A," after which the removable storage slot adapter determines whether the read data is located in a storage device or at a storage service over a network. If in operation 730, the removable storage slot adapter determines that the read source is the storage service, the removable storage slot adapter may generate a request to read the data in operation 732. The removable storage slot adapter may generate one or more requests to read the data from the storage service. The removable storage slot adapter may generate any suitable type of request, such as an application program interface (API) request, an HTTP request, an SQL request, an FTP request, and the like.

In operation 734, the removable storage slot adapter may send the request to the storage service over the network. In operation 736, the removable storage slot adapter may receive a response from the storage service over the network. The response may include the read data, status of a transfer of the read data to the removable storage slot adapter, and the like. In operation 738, the removable storage slot adapter may determine whether to store the read data in the response from the storage service in a local cache. The removable storage slot adapter may store data retrieved from the storage service in the storage device. If the removable storage slot adapter determines in operation 738 to store the read data in the cache, in operation 740, the removable storage slot adapter caches the data in the storage device. In operation 742, the removable storage slot adapter then sends the data to the device. The method 700 returns to FIG. 7A starting with block "C," as discussed above, where the removable storage slot adapter may send the data to the device in a response to the command.

If in operation 730, the removable storage slot adapter determines that the read source is the storage device, the removable storage slot adapter may identify the location of the data in the storage device in operation 744. The removable storage slot adapter may utilize one or more mappings between the address space of the emulated removable storage device and data in the storage service and the storage device. In operation 746, the removable storage slot adapter may retrieve the data from the storage device. The removable storage slot adapter may then send the data to the device in operation 742.

Referring to FIG. 7C, the method 700 continues starting with block "B," after which the removable storage slot adapter determines whether the write data destination is located in a storage device or at a storage service over a network. If in operation 750, the removable storage slot adapter determines that the write destination is the storage service, the removable storage slot adapter may generate a request to write the data in operation 752. The removable storage slot adapter may generate one or more requests to write the data to the storage service.

In operation 754, the removable storage slot adapter may send the request to the storage service over the network. In operation 756, the removable storage slot adapter may receive a response from the storage service over the network. The response may include a write confirmation, a status of a transfer of the data to the storage service, and the like. The method 700 returns to FIG. 7A starting with block "C," as discussed above, where the removable storage slot adapter may send a response to the command to the device.

If in operation 750, the removable storage slot adapter determines that the write destination is the storage device, the removable storage slot adapter may identify the location of the data in the storage device in operation 758. The removable storage slot adapter may utilize one or more mappings between the address space of the emulated removable storage device and data in the storage service and/or the storage device.

In operation 760, the removable storage slot adapter may determine whether the location of the data is read-only. If in operation 766, the removable storage slot adapter determines the location is not read-only, the removable storage slot adapter may write the data to the storage device in operation 768. The method 700 returns to FIG. 7A starting with block "C," as discussed above, where the removable storage slot adapter may send a response to the command to the device.

If in operation 766, the removable storage slot adapter determines the location is read-only, the removable storage slot adapter may buffer the data in a memory, such as in a memory device or at another location in the storage device, in operation 770. The removable storage slot adapter may buffer one or more changes to the data in the memory. In operation 772, the removable storage slot adapter may determine whether to update the storage service over the network with the changes to the data. If in operation 772, the removable storage slot adapter determines to update the storage service, the method 700 continues again in operation 752 where the removable storage slot adapter generates a request to write the data to the storage service. If in operation 772, the removable storage slot adapter determines not to update the storage service, the method 700 returns to FIG. 7A starting with block "C," as discussed above, where the removable storage slot adapter may send a response to the command to the device.

Figure 8:
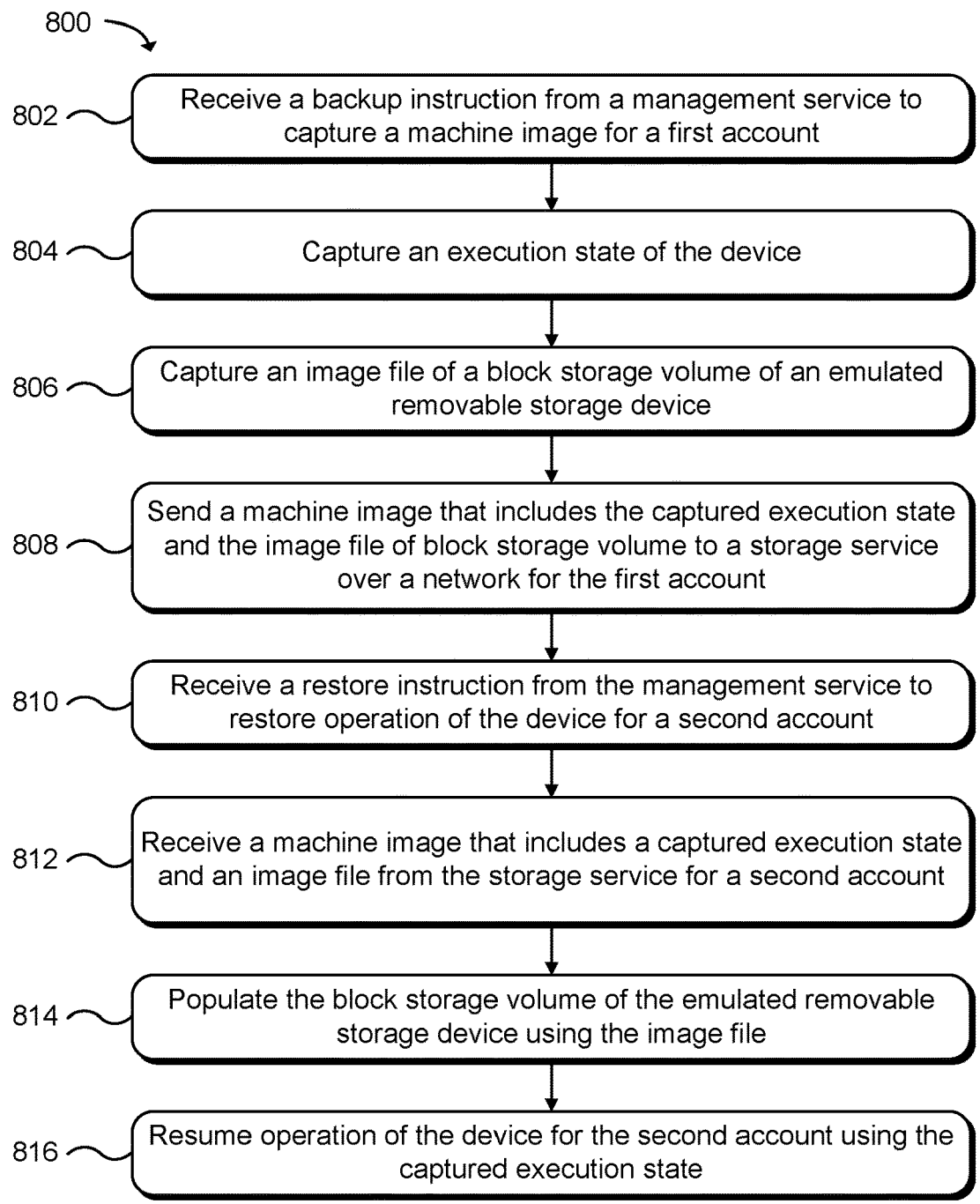
FIG. 8 is a flowchart of a method for providing multi-account access to a physical device in a physical device farm using a removable storage slot adapter according to one example of the present technology.

FIG. 8 is a flowchart of a method 800 for multi-account control of a device using a removable storage slot adapter according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 800 enables a removable storage slot adapter to control multi-account access to a device into which the removable storage slot adapter is inserted.

In operation 802, the removable storage slot adapter may receive a backup instruction from an adapter management service hosted by a service provider environment to capture a machine image for a first account. The removable storage slot adapter may receive the backup instruction over a network from the adapter management service. The backup instruction may include an instruction to suspend operation of the device.

In operation 804, the removable storage slot adapter may capture an execution state of the device. The removable storage slot adapter may capture a processor context, register contents, an image of one or more memory devices, input/output (I/O) state, a list of running processes, a list of open file handles, and the like to generate the execution state of the device. In operation 806, the removable storage slot adapter may capture an image file of a block storage volume of the emulated removable storage device presented to the device by the removable storage slot adapter. The image file may include data stored in a storage device within the removable storage slot adapter and data stored in a storage service accessible over a network. The image file may include the actual data, references to locations where the data is stored, or combinations thereof.

In operation 808, the removable storage slot adapter may send a machine image that includes the captured execution state of the device and the image file of the block storage volume to the storage service over the network for the first account. The storage service may store the machine image with other data owned by the first account.

In operation 810, the removable storage slot adapter may receive a restore instruction from the adapter management service to restore operation of the device for a second account. The removable storage slot adapter may receive the restore instruction over the network from the adapter management service. The restore instruction may include an instruction to resume operation of the device.

In operation 812, the removable storage slot adapter may receive a machine image that includes a captured execution state of the device and an image file of a block storage volume from the storage service for the second account. In operation 814, the removable storage slot adapter may populate the block storage volume of the emulated removable storage device using the image file for the second account. In operation 816, the removable storage slot adapter may resume operation of the device for the second account using the captured execution state. The removable storage slot adapter may restore a processor context, register contents, an image of one or more memory devices, input/output (I/O) state, a list of running processes, a list of open file handles, and the like to restore the execution state of the device.

Figure 9:
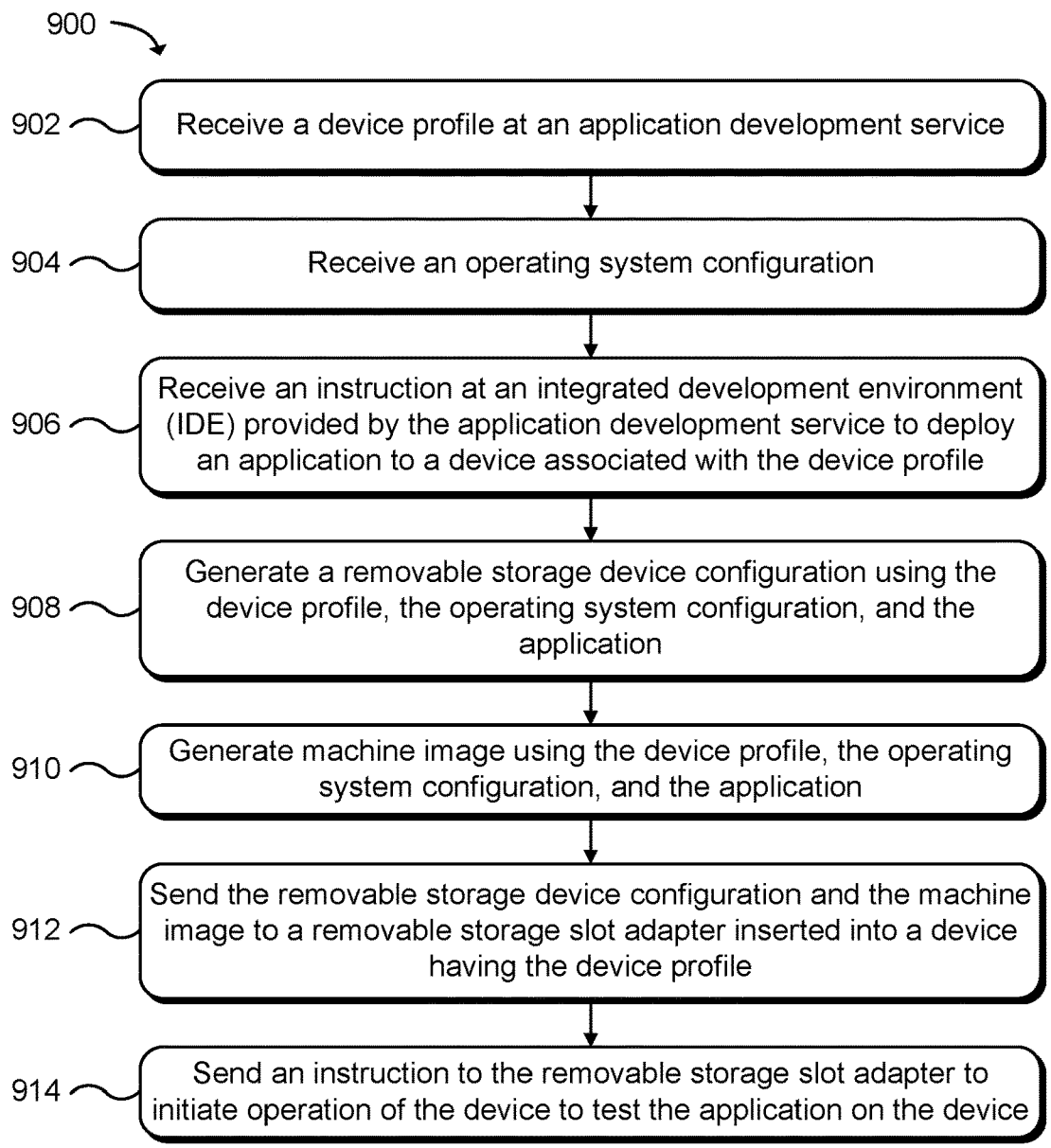
FIG. 9 is a flowchart of a method for controlling a physical device in a physical device farm via a removable storage slot adapter from an application development service according to one example of the present technology.

FIG. 9 is a flowchart of a method 900 for configuring an emulated removable storage device presented to a device via a removable storage slot adapter using an application development service according to one example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 900 enables application development service to facilitate the deployment and testing of applications with a device into which a removable storage slot adapter is inserted.

In operation 902, an application development service hosted by a service provider environment may receive a device profile. The device profile may specify hardware and/or software components of a device. The device profile may specify hardware components that are physically present on the device. The device profile may identify whether a hardware component that is physically present on the device is accessible to or is usable by accounts of the service provider environment through the application development service. The device profile may further specify software components that are available for execution by the device. The software components may include operating systems, applications, services, libraries, and the like.

In operation 904, the application development service may receive an operating system configuration for the device. The application development service may receive a selection of components that form the operation system of the device. In another example, the application development service may receive selection of multiple operating systems, each of which may be chosen during a boot process to load by the device.

In operation 906, the application development service may receive an instruction at an integrated development environment (IDE) provided by the application development service to deploy an application to a device associated with the device profile. For example, customer of the service provider environment may develop the application using the IDE. The IDE may provide a user interface from which the application may be deployed for execution to computing instances owned by an account of the customer or to the device into which the removable storage slot adapter is inserted.

The application development service may select from among a plurality of available devices each having at least one removable storage slot adapter inserted to allocate one or more available devices to the account. In operation 908, the application development service may generate a removable storage configuration using the device profile, the operating system configuration, and the application. The application development service may include in the removable storage configuration one or more parameters associated with the types of removable storage devices that operate with the device as indicated in the device profile. The application development service may include in the removable storage configuration the values of the parameters as provided by the customer using the IDE. The application development service may further include in the removable storage configuration one or more parameters associated with an operating system identified in the operating system configuration. The application development service may also include in the removable storage configuration one or more parameters associated with the application under development in the IDE. The application development service may include in the removable storage configuration one or more emulation parameters for an emulated removable storage device presented to the device into which the removable storage slot adapter is inserted.

In operation 910, the application development service may generate a machine image using the device profile, the operating system configuration, and the application. The application development service may include additional software in the machine image data, such as firmware or drivers, associated with the device and as indicated in the device profile. The application development service may include in the machine image data provided by the customer using the IDE. The application development service may further include in the machine image one or more operating systems identified in the operating system configuration. The application development service may also include in the removable storage configuration any desired executable code for the application under development in the IDE. The application development service may include in the machine image a template for a block storage volume of the emulated removable storage device presented to the device into which the removable storage slot adapter is inserted.

In operation 912, the application development service may send the removable storage configuration and the machine image to the removable storage slot adapter inserted into devices having the device profile that have been allocated for use by the account. In operation 914, the application development service may send an instruction to the removable storage slot adapter of each device to initiate operation of the device to test the application on the device.

Example Computing Device

Figure 10:
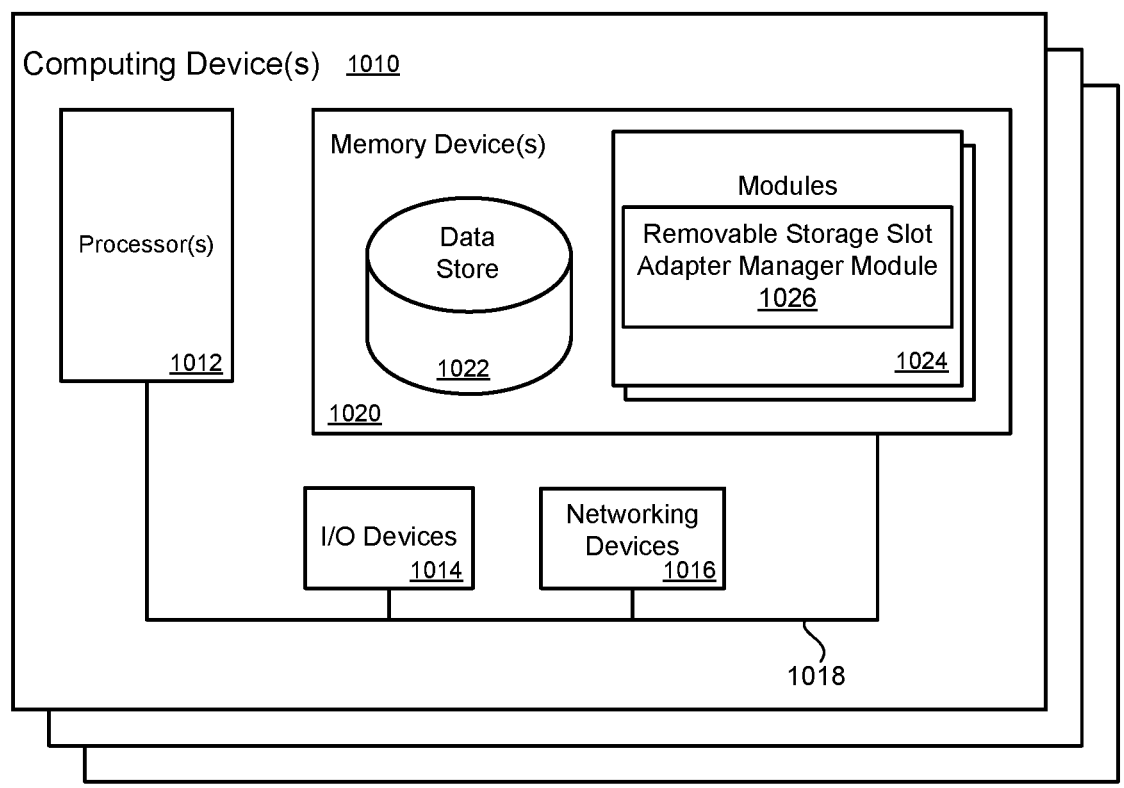
FIG. 10 illustrates one or more computing device(s) on which modules or code components of this technology may execute.

FIG. 10 illustrates one or more computing device(s) 1010 on which modules or code components of this technology may execute. A first computing device 1010 is illustrated on which a high-level example of the technology may be executed. The first computing device 1010 may include one or more processor(s) 1012 that are in communication with memory device(s) 1020. The computing device may include a local communication interface 1018 for the components in the computing device. For example, the local communication interface may be a local data bus and/or any related address or control busses as may be desired.

The memory device(s) 1020 may contain modules 1024 or code components that are executable by the processor(s) 1012 and data for the modules 1024. The modules 1024 may execute the functions described earlier. In this example, the memory device(s) 1020 include a removable storage slot adapter manager module 1026 operable to manage multi-account access to devices providing IoT functionality using removable storage slot adapters.

A data store 1022 may also be located in the memory device(s) 1020 for storing data related to the modules 1024 and other applications along with an operating system that is executable by the processor(s) 1012. Other applications may also be stored in the memory device(s) 1020 and may be executable by the processor(s) 1012. Components or modules discussed in this description that may be implemented in the form of software using high programming level languages that are compiled, interpreted, or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. The networking devices 1016 and similar communication devices may be included in the computing device. The networking devices 1016 may be wired or wireless networking devices that connect to the internet, a LAN, WAN, or other computing network.

The components or modules that are shown as being stored in the memory device(s) 1020 may be executed by the processor(s) 1012. The term "executable" may mean a program file that is in a form that may be executed by a processor(s) 1012. For example, a program in a higher-level language may be compiled into machine code in a format that may be loaded into a random-access portion of the memory device(s) 1020 and executed by the processor(s) 1012, or source code may be loaded by another executable program and interpreted to generate instructions in a random access portion of the memory to be executed by a processor. The executable program may be stored in any portion or component of the memory device(s) 1020. For example, the memory device(s) 1020 may be random access memory (RAM), read only memory (ROM), flash memory, a solid-state drive, memory card, a hard drive, optical disk, floppy disk, magnetic tape, or any other memory components.

The processor(s) 1012 may represent multiple processors and the memory 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method, comprising:
   receiving, at a removable storage slot adapter configured to connect to a removable storage slot of a physical device, a command from the physical device to be processed by an emulated removable storage device presented to the physical device by the removable storage slot adapter, the emulated removable storage device presented to the physical device using a plurality of selectable block storage volumes, wherein, in response to a reboot of the physical device, the physical device switches access from a first block storage volume to a second block storage volume;
   interpreting the command from the physical device to access a data block of the emulated removable storage device;
   obtaining the data block at the removable storage slot adapter from a storage service in a service provider environment, wherein the storage service is accessible over a network when the data block of the emulated removable storage device is determined to be located at the storage service;
   generating a response to the command from the physical device using the emulated removable storage device and the data block; and
   sending the response to the physical device using the removable storage slot adapter.

2. The method of claim 1, wherein obtaining the data block from the storage service over a network further comprises:
   generating a request to read the data block from the storage service;
   sending the request to the storage service over the network; and
   receiving the data block from the storage service in response to the request.

3. The method of claim 1, further comprising:
   generating a request to write the data block to the storage service; and
   sending the request and data associated with the data block to the storage service over the network.

4. The method of claim 1, further comprising:
   obtaining the data block from a storage device within the removable storage slot adapter.

5. The method of claim 4, wherein interpreting the command from the physical device to access the data block of the emulated removable storage device further comprises at least one of: reading the data block and writing data associated with the data block.

6. The method of claim 1, further comprising:
   receiving a removable storage configuration over the network from a management service hosted by the service provider environment; and
   presenting the emulated removable storage device to the physical device using the removable storage configuration.

7. The method of claim 6, further comprising:
   determining a set of emulation parameters for the emulated removable storage device from the removable storage configuration; and configuring the emulated removable storage device using the set of emulation parameters; and wherein the set of emulation parameters includes at least one of: a memory card size, a memory card speed, a memory card manufacturer, a memory card security setting, and a memory card feature.

8. The method of claim 6, further comprising:

identifying an image file for the emulated removable storage device from the removable storage configuration;

retrieving data in the image file from the storage service over the network; and loading a block storage volume of the emulated removable storage device using the data in the image file.

9. The method of claim 1, further comprising:

receiving a removable storage configuration from an integrated development environment (IDE) service hosted by the service provider environment over the network;

receiving an application from the IDE service over the network; and presenting the emulated removable storage device to the physical device using the removable storage configuration and the application.

10. The method of claim 1, further comprising:

capturing a machine image file for the physical device in response to a backup instruction received from a management service hosted by the service provider environment;

sending the machine image file over the network to the storage service;

retrieving the machine image file from the storage service over the network in response to a restore instruction received from the management service; and resuming execution of the physical device using the machine image file.

11. The method of claim 1, wherein the emulated removable storage device includes a set of emulation parameters specifying how the emulated removable storage device is presented to the removable storage slot adapter.

12. A non-transitory computer readable medium storing instructions that when executed by a processor cause the processor to:

present, at a removable storage slot adapter configured to connect to a removable storage slot of a physical device, an emulated removable storage device using a removable storage configuration obtained over a network from a management service;

interpret a command from the physical device that is directed to the emulated removable storage device to access a data block of the emulated removable storage device;

access the data block in a storage device within the removable storage slot adapter when the data block is determined to be located in the storage device in the removable storage slot adapter;

access, at the removable storage slot adapter, the data block over the network from a storage service hosted in a service provider environment when the data block of the emulated removable storage device is determined to be located over the network in the storage service;

generate a response to the command from the physical device using the emulated removable storage device and the data block that was accessed; and send the response to the physical device using the removable storage slot adapter.

13. The non-transitory computer readable medium of claim 12, wherein the instructions further cause the processor to:

determine a set of emulation parameters for the emulated removable storage device from the removable storage configuration, wherein the set of emulation parameters includes a memory card size and a memory card speed; and present the emulated removable storage device to the physical device using the set of emulation parameters as a memory card having the memory card size and the memory card speed.

14. The non-transitory computer readable medium of claim 13, wherein the instructions further cause the processor to:

identify an image file for the emulated removable storage device from the removable storage configuration;

receive a first portion of data in the image file from the storage service over the network; store the first portion of the data in the image file in the storage device; and load a block storage volume of the emulated removable storage device using the first portion of the data in the image file in the storage device.

15. The non-transitory computer readable medium of claim 12, wherein the instructions further cause the processor to:

capture a machine image file for the physical device in response to a backup instruction received from a management service hosted by the service provider environment for a first account in the service provider environment;

send the machine image file over the network to the storage service;

retrieve an additional machine image file from the storage service over the network in response to a restore instruction received from the management service for a second account in the service provider environment and resume execution of the physical device using the additional machine image file.

16. The non-transitory computer readable medium of claim 12, wherein the instruction further cause the processor to:

receive the removable storage configuration from an integrated development environment (IDE) service hosted by the service provider environment;

receive an application from the IDE service over the network; and present the emulated removable storage device by the removable storage slot adapter to the physical device using the removable storage configuration and the application.

17. A removable storage slot adapter configured to be inserted into a removable storage slot of a physical device, comprising:

a processor; and a memory to store instructions which when executed by the processor configure the processor to:

receive a removable storage configuration associated with an account of a service provider environment from a management service hosted by the service provider environment using a network interface;

present an emulated removable storage device to the physical device using the removable storage configuration;

interpret a command from the physical device for the emulated removable storage device to access a data block of a block storage volume of the emulated removable storage device;

access, using the network interface, the data block in a storage service hosted by the service provider environment when the data block of the block storage volume of the emulated removable storage device is determined to be located over a network at the storage service;

access the data block in a storage device within the removable storage slot adapter when the data block of the block storage volume is determined to be located at the storage device; and send a response to the physical device based on accessing the data block.

18. The removable storage slot adapter of claim 17, wherein the instructions further configure the processor to:
access, using the network interface, the data block stored in the storage service to read from or write to the data block of the block storage volume.

19. The removable storage slot adapter of claim 17, wherein the instructions further configure the processor to:
receive an additional removable storage configuration associated with an additional account of the service provider environment; and present an additional emulated removable storage device to the physical device using the additional removable storage configuration when the physical device is operated by the additional account.

20. The removable storage slot adapter of claim 17, wherein the instructions further configure the processor to:
buffer a change made to the data block of the block storage volume when the data block is stored in the storage device as read-only; and send the change made to the data block of the block storage volume to the storage service for storage at the storage service.

* * * * *